US011616775B2

(12) United States Patent
Yin

(10) Patent No.: US 11,616,775 B2
(45) Date of Patent: Mar. 28, 2023

(54) NETWORK ACCESS AUTHENTICATION METHOD, APPARATUS, AND SYSTEM

(71) Applicant: Alibaba Group Holding Limited, Grand Cayman (KY)

(72) Inventor: Hongzhan Yin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 342 days.

(21) Appl. No.: 16/632,316

(22) PCT Filed: Jul. 9, 2018

(86) PCT No.: PCT/CN2018/094933
§ 371 (c)(1),
(2) Date: Jan. 17, 2020

(87) PCT Pub. No.: WO2019/015500
PCT Pub. Date: Jan. 24, 2019

(65) Prior Publication Data
US 2020/0169548 A1    May 28, 2020

(30) Foreign Application Priority Data
Jul. 20, 2017   (CN) .......................... 201710595977.6

(51) Int. Cl.
*H04L 9/40*   (2022.01)
*H04L 9/08*   (2006.01)
(Continued)

(52) U.S. Cl.
CPC .......... *H04L 63/083* (2013.01); *H04L 9/0866* (2013.01); *H04L 9/0869* (2013.01);
(Continued)

(58) Field of Classification Search
CPC ... H04L 63/083; H04L 9/0866; H04L 9/0869; H04L 9/3226; H04L 63/0876; H04W 12/06
See application file for complete search history.

(56) References Cited

U.S. PATENT DOCUMENTS 7,360,096 B2 *  4/2008  Bracewell ............. H04L 9/3247
                                                  713/183
7,454,785 B2   11/2008  Kerstens et al.
(Continued)

FOREIGN PATENT DOCUMENTS

CN         1694555      11/2005
CN       101500232 A     8/2009
(Continued)

OTHER PUBLICATIONS

Aimaschana Niruntasukrat et al. "Authorization Mechanism for MQTT-based Internet of Things", 2016, IEEE, 6 pages (Year: 2016).*

*Primary Examiner* — Catherine Thiaw

(57) ABSTRACT

Embodiments of the present application provide a network access authentication method, apparatus, and system. The network access authentication method mainly comprises: obtaining a user name by a network access management client through encryption using a device ID of a terminal device, and obtaining a dynamic password through encryption using the device ID and a time value within a time step, so that the terminal device performs network access authentication using the user name and the dynamic password. The device ID is uniquely assigned by an authentication server to the terminal device, and thus functions to identify the identity of the terminal device, so that network access authentication can be independent of digital certificates, thereby solving the problem that the terminal device cannot accomplish network access authentication for unsupported (Continued)

use of or unavailability of a digital certificate, while meeting network access security requirements.

16 Claims, 13 Drawing Sheets

(51) Int. Cl.
 *H04L 9/32* (2006.01)
 *H04W 12/06* (2021.01)
(52) U.S. Cl.
 CPC ........ *H04L 9/3226* (2013.01); *H04L 63/0876* (2013.01); *H04W 12/06* (2013.01)

(56) References Cited

U.S. PATENT DOCUMENTS

| | | | |
|---|---|---|---|
| 7,681,033 | B2 | 3/2010 | Miura et al. |
| 8,627,424 | B1 | 1/2014 | O'Malley et al. |
| 8,769,304 | B2 | 7/2014 | Kirsch |
| 9,084,071 | B2 * | 7/2015 | Lisboa ................ H04W 60/00 |
| 9,112,909 | B2 | 8/2015 | Kaippallimalil et al. |
| 9,378,345 | B2 | 6/2016 | Zhang et al. |
| 9,594,922 | B1 * | 3/2017 | McGuire ............... H04L 9/0891 |
| 9,641,521 | B2 | 4/2017 | Egan et al. |
| 10,057,763 | B2 | 8/2018 | Redberg et al. |
| 10,171,439 | B2 | 1/2019 | Camenisch et al. |
| 10,348,721 | B2 | 7/2019 | Wang et al. |
| 10,785,219 | B1 * | 9/2020 | Streete ............... H04L 63/0876 |
| 2004/0123159 | A1 | 6/2004 | Kerstens et al. |
| 2006/0036858 | A1 | 2/2006 | Miura et al. |
| 2007/0186115 | A1 | 8/2007 | Gao et al. |
| 2007/0220594 | A1 | 9/2007 | Tulsyan |
| 2009/0097459 | A1 | 4/2009 | Jendbro et al. |
| 2009/0271850 | A1 | 10/2009 | Hoppe et al. |
| 2009/0271851 | A1 | 10/2009 | Hoppe et al. |
| 2011/0209202 | A1 | 8/2011 | Otranen |
| 2011/0219427 | A1 | 9/2011 | Hito et al. |
| 2013/0227661 | A1 * | 8/2013 | Gupta ..................... G06F 21/31 726/6 |
| 2013/0262873 | A1 | 10/2013 | Read et al. |
| 2015/0312250 | A1 | 10/2015 | Redberg et al. |
| 2015/0332074 | A1 | 11/2015 | Asami et al. |
| 2016/0087954 | A1 * | 3/2016 | Zhang .................. H04W 12/06 726/6 |
| 2016/0149894 | A1 | 5/2016 | Jneid et al. |
| 2018/0255004 | A1 * | 9/2018 | Lanka ..................... H04L 67/26 |
| 2018/0255456 | A1 * | 9/2018 | Yin ...................... H04L 9/0643 |
| 2018/0278607 | A1 * | 9/2018 | Loladia ............... H04L 61/1588 |
| 2018/0310142 | A1 * | 10/2018 | Samdani .................. H04L 51/04 |
| 2018/0330368 | A1 * | 11/2018 | Slupesky ......... G06Q 20/38215 |

FOREIGN PATENT DOCUMENTS

| | | |
|---|---|---|
| CN | 102378175 | 3/2012 |
| CN | 104539785 | 4/2015 |
| CN | 105099690 A | 11/2015 |
| CN | 106789883 A | 5/2017 |
| CN | 106888455 A | 6/2017 |
| EP | 1555591 | 8/2013 |
| TW | 201643791 A | 12/2016 |
| WO | WO2004095772 | 11/2004 |
| WO | WO/2019/015500 | 1/2009 |
| WO | 2014106031 A1 | 7/2014 |
| WO | WO2015130700 | 9/2015 |

* cited by examiner

NETWORK ACCESS AUTHENTICATION METHOD, APPARATUS, AND SYSTEM

The present application claims priority to Chinese Patent Application No. 201710595977.6, filed on Jul. 20, 2017 and entitled "NETWORK ACCESS AUTHENTICATION METHOD, APPARATUS, AND SYSTEM," and corresponding PCT Patent Application NO. PCT/CN2018/094933 filed Jul. 9, 2018 and Published Jan. 24, 2019 as WIPO Publication NO. WO/2019/015500, all of which are incorporated herein by reference in their entirety.

TECHNICAL FIELD

The present application relates to the field of network technologies, and in particular, to a network access authentication method, apparatus, and system.

BACKGROUND

With the wide application of wireless local area networks (WLANs), a network admission control (NAC) architecture has emerged to solve the problem of user access authentication in WLANs. The NAC architecture enables strict control with a highly fine granularity over terminals accessing WLANs, ensures network access of legitimate and secure terminals, and reduces security risks of WLANs.

Institute of Electrical and Electronics Engineers (IEEE) 802.1X is a common network access authentication technology for the NAC architecture. Extensible Authentication Protocol (EAP) authentication methods employed by 802.1X include EAP-MD5, Protected Extensible Authentication Protocol (e.g., Protected-EAP or PEAP), EAP-Transport Layer Security (TLS), EAP-Tunneled Transport Layer Security (TTLS), and Lightweigth Extenstible Authentication Protocol (e.g., Lightweight-EAP or LEAP). Among them, the EAP-TLS authentication method is a certificate-based mutual authentication method, which has advantages in terms of security, practicability, etc., and has therefore become a preferred network access authentication method of many enterprises.

The EAP-TLS authentication method requires the use of digital certificates to verify device identities. However, in actual scenarios, especially on a terminal device side, problems of unsupported use of or unavailability of digital certificates often arise, causing failures to accomplish network access authentication. Therefore, a network access authentication that is compatible with various devices and can meet requirements for device identification, security, and etc. is desired.

SUMMARY

A plurality of aspects of the present application provide a network access authentication method, apparatus, and system for performing network access authentication on a terminal device, so as to meet requirements for device identification, security, etc., and solve the problem of device compatibility.

In one embodiment, a network access authentication method comprises:

acquiring, according to a network access instruction of a terminal device, a device ID of the terminal device and a user name obtained by encrypting the device ID, wherein the device ID is generated by an authentication server for the terminal device;

encrypting the device ID and a time value within a current time step using a seed key agreed upon with the authentication server, so as to obtain a dynamic password; and providing the user name and the dynamic password to the terminal device, so that the terminal device generates a network access authentication request and sends the network access authentication request to the authentication server for network access authentication.

In one embodiment, a network access authentication method further comprises:

sending a network access instruction to a network access management client in response to a network access triggering operation, so as to instruct the network access management client to provide to a terminal device at a local end a user name and a dynamic password required for network access;

acquiring the user name and the dynamic password provided by the network access management client, wherein the user name is obtained by encrypting a device ID of the terminal device, the dynamic password is obtained by encrypting the device ID and a time value within a current time step, and the device ID is generated by an authentication server for the terminal device; and generating a network access authentication request according to the user name and the dynamic password, and sending the network access authentication request to the authentication server, so that the authentication server performs network access authentication on the terminal device.

In one embodiment, a network access authentication method further comprises:

receiving a network access authentication request sent by a terminal device, wherein the network access authentication request comprises a user name and a dynamic password;

decrypting the user name according to a set decryption algorithm;

performing creditability verification on the terminal device according to a device ID of the terminal device that is decrypted from the user name; and performing legitimacy verification on the terminal device according to a creditability verification result, the device ID, and the dynamic password in the network access authentication request.

The embodiments of the present application further provide an electronic device, comprising: a memory and a processor, wherein the memory is configured to store a program; and the processor is coupled to the memory and configured to execute the program in the memory, so as to:

acquire, according to a network access instruction of a terminal device, a device ID of the terminal device and a user name obtained by encrypting the device ID, wherein the device ID is generated by an authentication server for the terminal device;

encrypt the device ID and a time value within a current time step using a seed key agreed upon with the authentication server, so as to obtain a dynamic password; and provide the user name and the dynamic password to the terminal device, so that the terminal device generates a network access authentication request and sends the network access authentication request to the authentication server for network access authentication.

In one embodiment, a terminal device further comprises: a memory, a processor, and a communication component, wherein the memory is configured to store a program;

the processor is coupled to the memory and configured to execute the program in the memory, so as to:

control the communication component to send a network access instruction to a network access management client in response to a network access triggering operation, so as to instruct the network access management client to provide to the terminal device a user name and a dynamic password required for network access;

acquire the user name and the dynamic password provided by the network access management client, wherein the user name is obtained by encrypting a device ID of the terminal device, the dynamic password is obtained by encrypting the device ID and a time value within a current time step, and the device ID is generated by an authentication server for the terminal device; and generate a network access authentication request according to the user name and the dynamic password, and control the communication component to send the network access authentication request to the authentication server, so that the authentication server performs network access authentication on the terminal device; and the communication component is configured to send the network access instruction to the network access management client and send the network access authentication request to the authentication server.

In one embodiment, an authentication server, comprises: a memory, a communication component, and a processor, wherein the memory is configured to store a program;

the communication component is configured to receive a network access authentication request sent by a terminal device, wherein the network access authentication request comprises a user name and a dynamic password; and the processor is coupled to the memory and configured to execute the program in the memory, so as to:

decrypt the user name according to a set decryption algorithm;

perform creditability verification on the terminal device according to a device ID of the terminal device that is decrypted from the user name; and perform legitimacy verification on the terminal device according to a creditability verification result, the device ID, and the dynamic password in the network access authentication request.

In one embodiment, an authentication system, comprises: a terminal device, a network access management client, and an authentication server, wherein the terminal device is configured to send a network access instruction to the network access management client in response to a network access triggering operation; acquire a user name and a dynamic password provided by the network access management client; and generate a network access authentication request according to the user name and the dynamic password, and send the network access authentication request to the authentication server;

the network access management client is configured to acquire the device ID and the user name according to the network access instruction; encrypt the device ID and a time value within a current time step using a seed key agreed upon with the authentication server, so as to obtain the dynamic password; and provide the user name and the dynamic password to the terminal device, wherein the user name is obtained by encrypting the device ID; and the authentication server is configured to receive the network access authentication request, wherein the network access authentication request comprises the user name and the dynamic password; perform creditability verification on the terminal device according to the device ID decrypted from the user name; and perform legitimacy verification on the terminal device according to a creditability verification result, the device ID, and the dynamic password.

In one embodiment, a network access management client obtains a user name through encryption using a device ID of a terminal device, and obtains a dynamic password through encryption using the device ID and a time value within a time step, so that the terminal device performs network access authentication using the user name and the dynamic password. Since the device ID is uniquely assigned by an authentication server to the terminal device, the device ID functions to identify the identity of the terminal device. Therefore, for the authentication server, on one hand, the identity of the device can be identified according to the device ID in the user name without requiring a digital certificate, thereby solving the problem that the terminal device cannot accomplish network access authentication for unsupported use of or unavailability of a digital certificate, and allowing applicability to network access authentication on various types of devices; on the other hand, as compared with static field passwords, network access authentication performed based on the dynamic password in combination with the device ID has higher security and meets security requirements.

BRIEF DESCRIPTION OF THE DRAWINGS

The accompanying drawings described herein are used for providing further understanding of the present application and constitute a part of the present application. Schematic embodiments of the present application and the description thereof are used for explaining the present application instead of constituting improper limitations on the present application.

DETAILED DESCRIPTION

Figure 1:
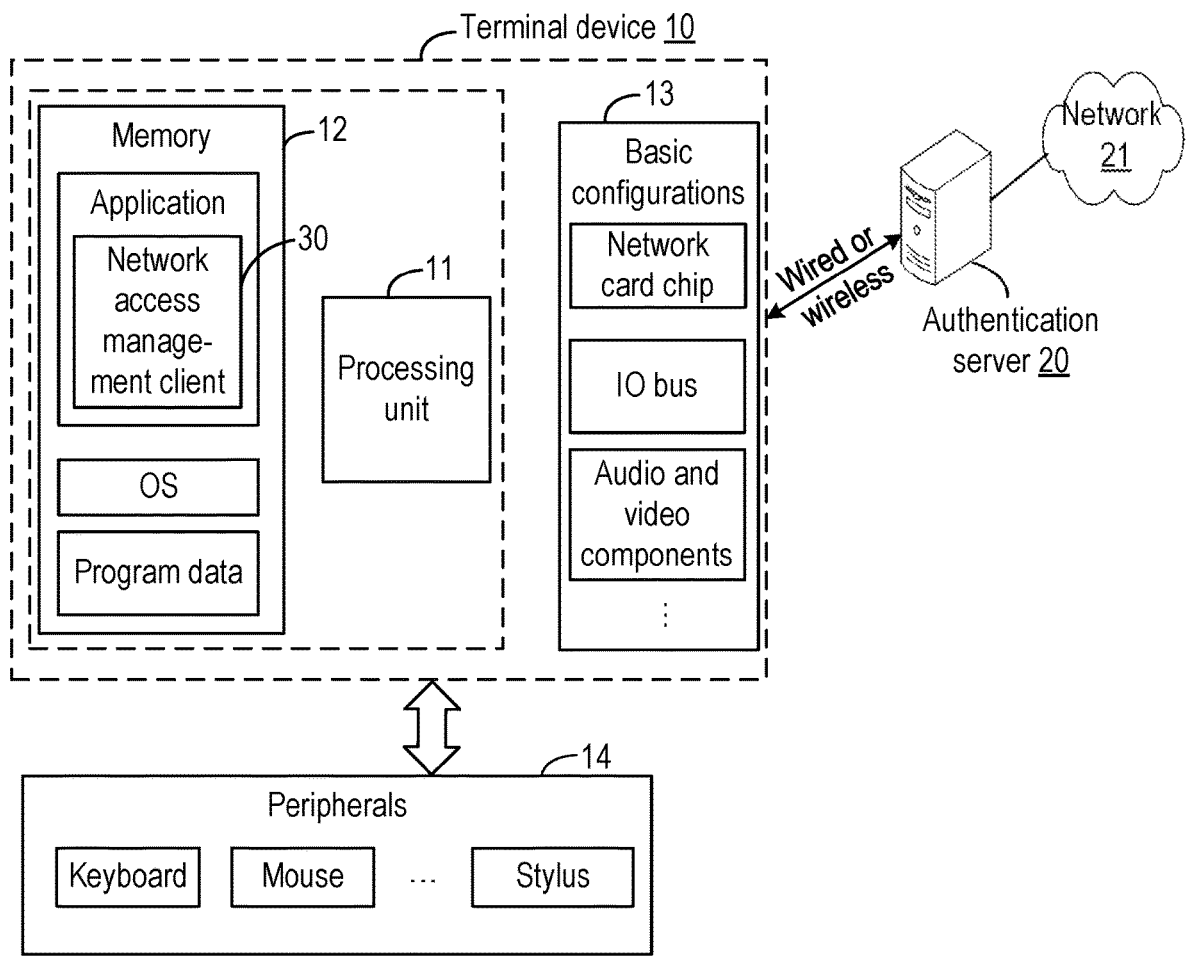
FIG. 1 is a schematic structural diagram of an exemplary network access authentication system provided in an exemplary embodiment of the present application.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail so as not to unnecessarily obscure aspects of the current invention. To make the objectives, technical solutions, and advantages of the present application clearer, the technical solutions in the present application will be described below with reference to the specific embodiments and the corresponding accompanying drawings of the present application. It is apparent that the described embodiments are merely some, rather than all of the embodiments of the present application. Other embodiments obtained by those of ordinary skill in the art based on the embodiments in the present application without making undue creative efforts shall fall within the protection scope of the present application.

In the prior art, because of the advantages of the EAP-TLS authentication method in terms of security, practicability, and etc., the EAP-TLS authentication method has become a preferred network access authentication method of many enterprises. However, the EAP-TLS authentication method requires the use of digital certificates to verify identities of network accessing devices, while in the past some terminal devices often have problems of unsupported use of or unavailability of digital certificates, and consequently cannot accomplish network access authentication.

In view of the aforementioned technical problem, the embodiments of the present application provide a solution employing the following main principles: an authentication server assigns a device ID to a terminal device that can uniquely identify the terminal device; a network access management client cooperatively operates to provide to the terminal device a user name and a dynamic password obtained by encrypting the device ID of the terminal device; and the terminal device participates in network access authentication using the user name and the dynamic password. In one embodiment, the authentication server can confirm the identity of the terminal device according to the device ID in the user name. In one exemplary implementation, network access authentication performed based on the dynamic password in combination with the device ID has higher security and meets security requirements.

The technical solutions provided in the embodiments of the present application are described in detail below with reference to the accompanying drawings.

FIG. 1 is a schematic structural diagram of an exemplary network access authentication system provided in an exemplary embodiment of the present application. As shown in FIG. 1, the system includes: a terminal device 10, an authentication server 20, and a network access management client 30. The terminal device 10 may be connected to the authentication server 20 in a wired or wireless manner.

The authentication server 20 belongs to a network 21 and is mainly responsible for network access authentication control for the network 21 to which it belongs, and ensuring the security of the network 21. The authentication server 20 may be any device capable of providing a computing service, responding to a service request, and performing processing, for example, a conventional server, a cloud server, a cloud host, or a virtual center. In one embodiment, a server includes a processor, a hard disk, a memory, a system bus, and etc. In one exemplary implementation the server is similar to a general-purpose computer architecture.

The terminal device 10 may be various types of devices, including a smart phone, a tablet computer, a personal computer, a wearable device, or the like. In one embodiment, the terminal device 10 includes at least one processing unit 11 and at least one memory 12. The number of the processing units 11 and memories 12 depends on the configuration and type of the terminal device 10. The memory 12 may include a volatile memory, for example, a random access memory (RAM), may include a non-volatile memory, for example, a read-only memory (ROM) or a flash memory, or may include both types of memories. The memory 12 may store an operating system (OS) and one or a plurality of application programs, and may further store program data or the like. In addition to the processing unit 11 and the memory 12, the terminal device further includes some basic configurations 13, for example, a network card chip, an 10 bus, and audio and video components. Optionally, the terminal device 10 may further include some peripherals 14, for example, a keyboard, a mouse, a stylus, and a printer.

In this exemplary network access authentication system, the terminal device 10 may access the network 21 to which the authentication server 20 belongs, but needs to pass network access authentication. The terminal device 10 is mainly configured to initiate a network access authentication request to the authentication server 20 according to a user name and a dynamic password; the network access management client 30 is mainly configured to provide to the terminal device 10 the user name and the dynamic password required for network access authentication; the authentication server 20 is mainly configured to perform network access authentication on the terminal device 10 according to the network access authentication request. It should be noted that network access operations of the terminal device 10 may be system-level operations and may be processed by the OS of the terminal device.

In addition, the network access management client 30 may be implemented independently (not shown) of the terminal device 10, or may be implemented by installation and execution of an application program on the terminal device 10. In the network access authentication system shown in FIG. 1, the installation of the network access management client 30 on the terminal device 10 is used as an example. As shown in FIG. 1, in one embodiment, when the network access management client 30 is implemented by installation on the terminal device 10, the network access management client 30 is stored in the memory 12. The terminal device 10, in cooperation with the network access management client 30, can perform network access authentication using a device identity and a dynamic password.

When a user needs to access, via the terminal device 10, the network 21 to which the authentication server 20 belongs, the user may issue a network access triggering operation through the terminal device 10. For example, the user may issue the network access triggering operation through a settings option on the terminal device 10. In an exemplary device implementation, the terminal device 10 provides a settings option to the user, and the user clicks the settings option to enter a settings page, which includes various function settings supported by the OS, for example, sound, wallpaper, battery, local area network/Wi-Fi, operator, and other settings. The user continues to click the local area network/Wi-Fi settings to enter a local area network/Wi-Fi settings page. At this time, the terminal device 10 automatically searches for information of a nearby network having signal strength meeting set requirements and displays the network information on the local area network/Wi-Fi settings page. In this embodiment, it is assumed that the network information found by the terminal device 10 includes the network 21 to which the authentication server 20 belongs. The user triggers an operation of accessing the network 21 by clicking information of the network 21 on the local area network/Wi-Fi settings page.

The terminal device 10 may start network access processing in response to the network access triggering operation. The terminal device 10 sends a network access instruction to the network access management client 30, so as to instruct the network access management client 30 to provide to the terminal device 10 a user name and a dynamic password required for network access. The network access management client 30 receives the network access instruction, and starts an operation of acquiring the user name and the dynamic password according to the network access instruction. On one hand, the network access management client 30 acquires a device ID generated by the authentication server 20 for the terminal device 10 and capable of uniquely identifying the terminal device 10, and acquires the user name obtained by encrypting the device ID; on the other hand, the network access management client 30 encrypts the device ID and a time value within a current time step using a seed key agreed upon with the authentication server 20, so as to obtain the dynamic password. It is appreciated a time step can include a quantized measure of time, period of time, time range, time frame, and so on. Since the password generation process is combined with a time factor, the password is a dynamic password, and the dynamic password is a one-time password and needs to be regenerated each time the network is accessed.

Afterwards, the network access management client 30 provides the user name and the dynamic password to the terminal device 10. The terminal device 10 acquires the user name and the dynamic password provided by the network access management client 30, generates a network access authentication request according to the user name and the dynamic password, and sends the network access authentication request to the authentication server 20 so that the authentication server 20 performs network access authentication on the terminal device 10.

The network access management client 30 may provide the user name and the dynamic password to the terminal device 10 in various implementations.

In one exemplary implementation, when a user triggers a network access operation, the terminal device 10 presents a network access information page to the user as a way of acquiring a user name and a dynamic password. Optionally, a user name input box and a password input box are provided on the network access information page, where the user name input box is used for filling the user name therein, and the password input box is used for filling the dynamic password therein.

Optionally, the network access management client 30 may fill the user name and the dynamic password in the network access information page after acquiring the user name and the dynamic password. The terminal device 10 can later extract the user name and the dynamic password from the network access information page. For example, the network access management client 30 may automatically fill the user name in the user name input box on the network access information page and automatically fill the dynamic password in the password input box on the network access information page. Such an implementation manner of automatically filling the user name and the dynamic password in the network access information page by the network access management client 30 is efficient.

Optionally, the network access management client 30 may also output the user name and the dynamic password to a page of the network access management client 30 after acquiring the user name and the dynamic password, so that the user becomes cognizant of the user name and the password through the page. The user, after triggering the network access operation, can see the network access information page provided by the terminal device 10 and thus becomes cognizant that the user name and the dynamic password need to be inputted; then, the user accesses the page including the user name and the dynamic password that is provided by the network access management client 30. The network access management client 30 may present the page including the user name and the dynamic password to the user according to an access request of the user, so that the user copies the user name and the dynamic password from the page to the network access information page.

After the user name and the dynamic password are filled in the network access information page, the terminal device 10 may acquire the user name and the dynamic password from the network access information page, and then generate a network access authentication request and send the network access authentication request to the authentication server 20, so that the authentication server 20 performs network access authentication on the terminal device 10.

The authentication server 20 receives the network access authentication request sent by the terminal device 10, where the network access authentication request includes the user name and the dynamic password. The user name is obtained by encrypting a device ID of the terminal device 10, and the dynamic password is obtained by encrypting the device ID of the terminal device 10 and a time value within a current specified time step of the terminal device 10 using an agreed-upon seed key.

Afterwards, the authentication server 20 decrypts the user name; if the user name is not successfully decrypted, the authentication fails, and the terminal device 10 is denied access the network 21; if the device ID of the terminal device 10 is successfully decrypted from the user name, then creditability verification is performed on the terminal device 10 according to the decrypted device ID. Since the ID of the terminal device 10 is uniquely generated by the authentication server 20, the purpose of identifying the terminal device 10 can be achieved based on the device ID of the terminal device 10. If the terminal device 10 does not pass the creditability verification, then the authentication fails, and the terminal device 10 is denied access the network 21; if the terminal device 10 passes the creditability verification, then legitimacy verification may be performed on the terminal device 10 according to the device ID and the dynamic password in the network access authentication request. If the terminal device 10 passes the legitimacy verification, the terminal device 10 is allowed to access the network 21; if the terminal device 10 does not pass the legitimacy verification, the terminal device 10 is denied access to the network 21.

In view of the above, in this exemplary network access authentication system, the network access management client 30 provides to the terminal device 10 a user name obtained by encrypting a device ID of the terminal device and a dynamic password. The terminal device 10 performs network access authentication using the user name and the dynamic password, equivalent to performing network access authentication using the device ID and the dynamic password. From the perspective of the authentication server 20, on one hand, the identity of the terminal device can be identified according to the device ID in the user name; on the other hand, network access authentication performed based on the dynamic password in combination with the device ID has higher security and meets security requirements.

In an exemplary scenario, before the terminal device 10 performs network access authentication, the network access management client 30 may pre-register with the authentication server 20, and obtain data such as a user name, a device ID, and a seed key in advance through the registration process. In one embodiment shown in FIG. 2, a procedure of registering with the authentication server 20 by the network access management client 30 includes various steps.

In step 201, the network access management client 30 sends a registration request to the authentication server 20, where the registration request carries hardware information of the terminal device 10.

The hardware information is not limited herein. In one embodiment all hardware information related to the terminal device 10 is applicable. For example, the hardware information may be information related to a central processing unit (CPU), a display card, a hard disk, or the like of the terminal device 10.

Optionally, the registration request may further include user information and/or enterprise information corresponding to the terminal device 10.

In step 202, the authentication server 20 receives the registration request, parses out the hardware information of the terminal device 10 therefrom, and generates, according to the hardware information, a device ID capable of uniquely identifying the terminal device 10, which is denoted as a UMID.

Optionally, when the registration request includes the user information and/or the enterprise information, the authentication server 20 may store the user information and/or the enterprise information corresponding to the terminal device 10, and may further generate a user ID (UID) and/or an enterprise ID (Customer Identity, CID) for the terminal device according to the user information and/or the enterprise information. The UID is used for uniquely identifying a user to which the terminal device 10 belongs; the CID is used for uniquely identifying an enterprise to which the terminal device 10 belongs.

For example, the user information may include, but is not limited to, information such as an account and a password registered by the user, and a mailbox, a mobile phone number, and a nickname of the user. The enterprise information may include, but is not limited to, information such as an account and a password registered by the user, an enterprise registration place, an enterprise name, enterprise type, and enterprise scale.

In step 203, a set encryption algorithm is used. In one exemplary implementation, the authentication server 20 generates two dynamic tokens, namely, a token key (TokenKey, TK) and a process token (ProcessToken, PT).

The TK may be used as a user name required during network access authentication of the terminal device 10 and obtained by encrypting the UMID. The PT may be used as an encrypted seed key and may be obtained by encrypting the UMID, the TK, and a seed key.

Optionally, a Blowfish encryption algorithm may be used to encrypt the UMID so as to generate the TK.

Optionally, an AES-128 encryption algorithm may be used to encrypt the UMID, the TK, and the seed key so as to generate the PT.

Further, when the authentication server 20 generates the CID, the UID, and the UMID for the terminal device, the TK and the PT may be generated according to the CID, the UID, and the UMID. In one embodiment, encryption formulas for generating the TK and the PT according to the CID, the UID, and the UMID are respectively as follows:

$$TK=Blowfish(CID+UID+UMID+RANDOM+TIME, (app\_secret))$$

$$PT=TK+AES128(CID+UID+UMID, (app\_secret))$$

In the above encryption formulas, app_secret represents the seed key agreed upon between the network access management client 30 and the authentication server 20. The seed key may be an API interface key of the network access management client 30, which corresponds one-to-one to the network access management client 30.

In step 204, the authentication server sends the TK, the PT, and the UMID to the network access management client 30.

In step 205, the network access management client 30 receives the TK, the PT, and the UMID, and saves the UMID and the TK in local space.

In step 206 the network access management client 30 sends the PT to an independent encryption tool, so that the encryption tool decrypts the PT to obtain the seed key and store the seed key.

The encryption tool is a black box for the network access management client 30 and the authentication server 20. An encryption algorithm and a method of storing the seed key employed by the encryption tool are invisible to the outside, and the encryption tool has a tamper-proof function, and is prohibited from access or use in an insecure environment. In this way, the risk of the seed key being cracked can be reduced, and the security of the seed key can be ensured, thereby improving the security of network access authentication. The network access management client 30 and the authentication server only need to invoke the encryption tool when required.

Based on the aforementioned registration procedure, the network access management client 30 may pre-save the device ID of the terminal device 10 and the user name in the local space. Therefore, the network access management client 30 may directly read the device ID of the terminal device 10 and the user name from the local space when receiving a network access instruction. In one embodiment, the network access management client 30 may also request the device ID of the terminal device 10 and the user name from the authentication server 20 in real time when receiving a network access instruction. In one exemplary implementation, if the authentication server 20 does not deliver the device ID of the terminal device 10 and the user name to the network access management client 30 in the aforementioned registration procedure, then the network access management client 30 needs to request the device ID of the terminal device 10 and the user name from the authentication server 20 in real time when receiving the network access instruction. The authentication server 20 delivers the device ID of the terminal device 10 and the user name to the network access management client 30, and the encryption algorithm only needs to be saved on the side of the authentication server 20, thus having the advantage of reducing the probability of the encryption algorithm being cracked, thereby improving the security of the device ID and the user name.

In the aforementioned registration procedure implementation, the authentication server 20 may optionally store device IDs of registered devices through a registered device list, and store, for example, registered, deleted, frozen, and disabled statuses of the registered devices through a device status list. The registered device list and the device status list may be the same list, or may be two lists independent of each other.

Based on the registered device list and the device status list, the authentication server 20 may perform creditability verification on the terminal device 10 according to the registered device list and the device status list. An alternative implementation includes: when successfully decrypting the device ID of the terminal device 10, the authentication server 20 searches the registered device list according to the decrypted device ID to determine whether the terminal device 10 has been registered. If the decrypted device ID is found in the registered device list, the device status list is further queried to determine whether the status of the terminal device 10 is normal. If it is determined from the device status list that the terminal device 10 is in a normal state, it is determined that the terminal device 10 passes the creditability verification. If the decrypted device ID is not found in the registered device list or it is determined from the device status list that the terminal device 10 is in an abnormal state (for example, deleted, disabled, or frozen states, etc.), then it is determined that the terminal device 10 does not pass the creditability verification.

In an alternative implementation, the authentication server 20 may use a combination of a CID and/or a UID when generating a user name (e.g., a TK, etc.). Based on this, the authentication server 20 can further decrypt a TIMID from the user name in addition to the UID and/or the CID decrypted from the user name. In order to improve network security, multi-factor authentication may be performed from a device perspective, a user perspective, and an enterprise perspective. Based on this, before performing creditability verification on the terminal device 10, the authentication server 20 may perform, according to the UID and pre-registered user information and/or enterprise information, identity authentication on a user and/or an enterprise to which the terminal device 10 belongs. For example, an analysis may be performed whether the UID and/or the CID decrypted from the user name matches the pre-registered user information and/or enterprise information. If there is a match, it is determined that the user and/or the enterprise to which the terminal device 10 belongs passes the identity authentication. If there is not match, it is determined that the user and/or the enterprise to which the terminal device 10 belongs does not pass the identity authentication. When the user and/or the enterprise to which the terminal device 10 belongs passes the identity authentication, creditability verification is performed again on the terminal device 10.

In the aforementioned embodiment or following embodiment, after the terminal device 10 passes the creditability verification, the authentication server 20 needs to perform legitimacy verification on the terminal device 10 according to the device ID and a dynamic password in a network access authentication request.

In one exemplary implementation of performing legitimacy verification on the terminal device 10 includes: the authentication server 20 may determine at least two time steps, where the at least two time steps include a current time step and at least one historical time step closest to the current time step; for each of the at least two time steps, the decrypted device ID and a time value within each time step are encrypted using a seed key agreed upon with the network access management client 30 so as to generate at least two dynamic passwords; and legitimacy verification is performed on the terminal device according to the at least two dynamic passwords and a dynamic password in a network access authentication request. For example, the at least two dynamic passwords may be compared with the dynamic password carried in the network access authentication request; if a dynamic password is the same as the dynamic password carried in the network access authentication request exists in the at least two dynamic passwords, then it is determined that the terminal device 10 passes the legitimacy verification; if no dynamic password the same as the dynamic password carried in the network access authentication request exists in the at least two dynamic passwords, then it is determined that the terminal device 10 does not pass the legitimacy verification.

The authentication server 20 may also optionally store mapping data of authenticated devices. Herein, the authenticated devices include authenticated devices that are currently online and also include historical authenticated devices that have been offline. The mapping data of the authenticated devices includes, but is not limited to, data such as device IDs of the authenticated devices, media access control (MAC) addresses, UIDs, CIDs, and dynamic passwords used when authentication is passed. Based on this, the authentication server 20 may perform legitimacy verification on the terminal device according to the mapping data of the authenticated devices.

Another implementation manner of performing legitimacy verification on the terminal device 10 includes: the authentication server 20 judges, according to the device ID decrypted from the user name, whether a dynamic password used when the terminal device passed authentication last time exists in mapping data of authenticated devices. If the dynamic password used when the terminal device passes authentication last time exists in the mapping data of the authenticated devices, then legitimacy verification is performed on the terminal device 10 according to the dynamic password used when the terminal device passes authentication last time and a dynamic password carried in a network access authentication request. For example, the dynamic password used when the terminal device passes authentication last time may be compared with the dynamic password carried in the network access authentication request; if the two dynamic passwords are the same, then it is determined that the terminal device 10 passes the legitimacy verification; if the two dynamic passwords are not the same, then it is determined that the terminal device 10 does not pass the legitimacy verification.

If the dynamic password used when the terminal device passes authentication last time does not exist in the mapping data of the authenticated devices, then the authentication server 20 determines at least two time steps, and separately encrypts the device ID and a time value within each time step using a seed key agreed upon with the network access management client 30, so as to obtain at least two dynamic passwords. The at least two dynamic passwords are compared with the dynamic password carried in the network access authentication request and if a dynamic password is the same as the dynamic password carried in the network access authentication request is part of the at least two dynamic passwords, then it is determined that the terminal device 10 passes the legitimacy verification. If no dynamic password is the same as the dynamic password carried in the network access authentication request is part of the at least two dynamic passwords, then it is determined that the terminal device 10 does not pass the legitimacy verification.

Optionally, in the aforementioned authentication process, the authentication server 20 may also send a device ID and a time value within a current time step or a historical time step to the encryption tool, so that the encryption tool encrypts the device ID and the time value within the current time step or the historical time step using a previously agreed-upon seed key so as to obtain a dynamic key.

It should be noted that the dynamic password is valid in a certain period, and when the period ends, the dynamic password becomes invalid and is thus deleted. The results of dynamic password generation are the same within the same time step. The authentication server 20 does not know in which time step the dynamic password carried in the network access authentication request is generated. Moreover, due to the network, the time of the dynamic password generation end (namely, the network access management client 30) may be greatly different from the time at which the authentication server 20 receives the dynamic password; therefore, the two times may not be within the same time step. For example, such a case may exist that the network access management client 30 generates a dynamic password at the end of a time step, and the authentication server 20 receives the dynamic password at the beginning of the next time step, which is a reasonable case. Based on this, considering transmission delays, not only a current time step but also a historical time step adjacent to the current time step are considered in the aforementioned process of calculating a dynamic password, where one or a plurality of historical time steps may exist. The more the historical time steps, the greater the risk of being attacked, so the number of historical time steps may depend on the risk tolerance of the network.

Further, after obtaining an authentication result of the terminal device 10, the authentication server 20 may further return the authentication result to the terminal device 10. The authentication result includes an indication that the terminal device 10 passes the authentication, or the terminal device 10 does not pass the authentication.

Figure 3:
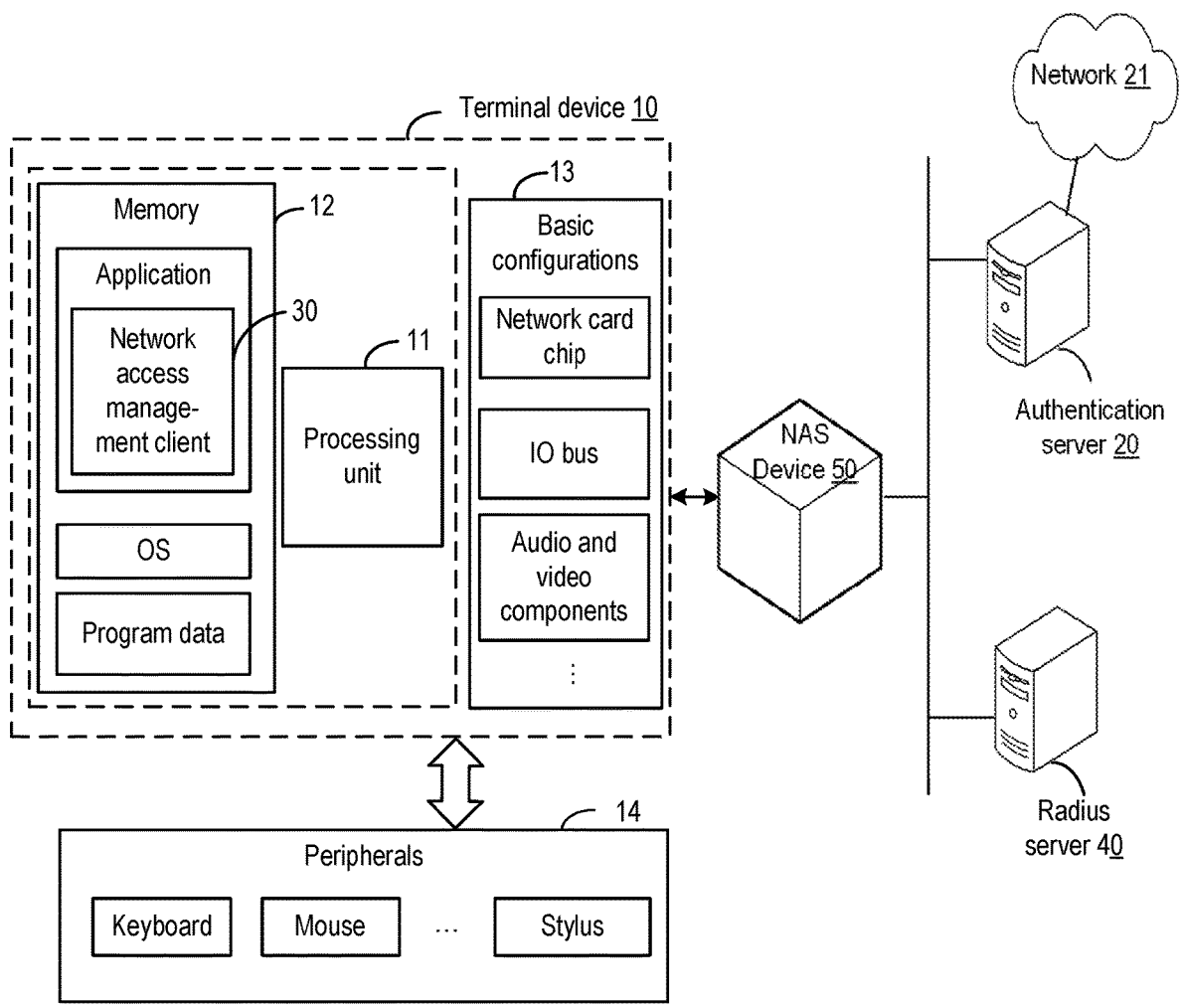
FIG. 3 is a schematic structural diagram of an exemplary network access authentication system provided in still another exemplary embodiment of the present application.

The network access authentication system shown in FIG. 1 may be deployed and implemented under an 802.1X protocol framework. Optionally, the network access authentication system shown in FIG. 1 may further be combined with an EAP-PEAP authentication method in the 802.1X protocol to form a new authentication method by using EAP-PEAP as a carrier, but is not limited to the combination with the EAP-PEAP authentication method. Based on this, as shown in FIG. 3, another exemplary network access authentication system mainly includes: a terminal device 10, an authentication server 20, a network access management client 30, a Radius server 40, and a network attached storage (NAS) device 50. The terminal device 10 is connected to the Radius server 40 via the NAS device 50, and the Radius server 40 is connected to the authentication server 20.

It should be noted that in addition to the terminal device 10, the NAS device 50, the Radius server 30, and the authentication server 20, the network access authentication system shown in FIG. 3 may further include some other network devices such as a gateway, may depend on network deployment conditions.

Functions of the terminal device 10, the authentication server 20, and the network access management client 30 are basically unchanged in the exemplary network access authentication system shown in FIG. 3. The terminal device 10 is still mainly configured to initiate a network access authentication request to the authentication server 20 according to a user name and a dynamic password, where reference is made to the foregoing description for the initiation process; the network access management client 30 is still mainly configured to provide to the terminal device 10 the user name and the dynamic password required for network access authentication; the authentication server 20 is still mainly configured to perform network access authentication on the terminal device 10, where reference is made to the foregoing description for the authentication process. The difference lies in that data exchanged between the terminal device 10 and the authentication server 20 needs to be encapsulated into a Remote Authentication Dial In User Service (Radius) protocol packet and forwarded through the Radius server 40.

Radius is a protocol of a client/server (C/S) structure, and the Radius server 40 and the NAS device 50 are respectively a server and a client in the Radius protocol. The NAS device 50 may be any device running Radius client software, and mainly provides services of access and interaction with the Radius server 40 to a remote access user (namely, the terminal device 10). In this embodiment, the Radius server 40 mainly serves as a proxy of the authentication server 20 and is responsible for encapsulating/decapsulating and forwarding Radius protocol packets, which is different from a Radius server in the traditional sense. The Radius server 40 may be any device running Radius server software.

Figure 2:
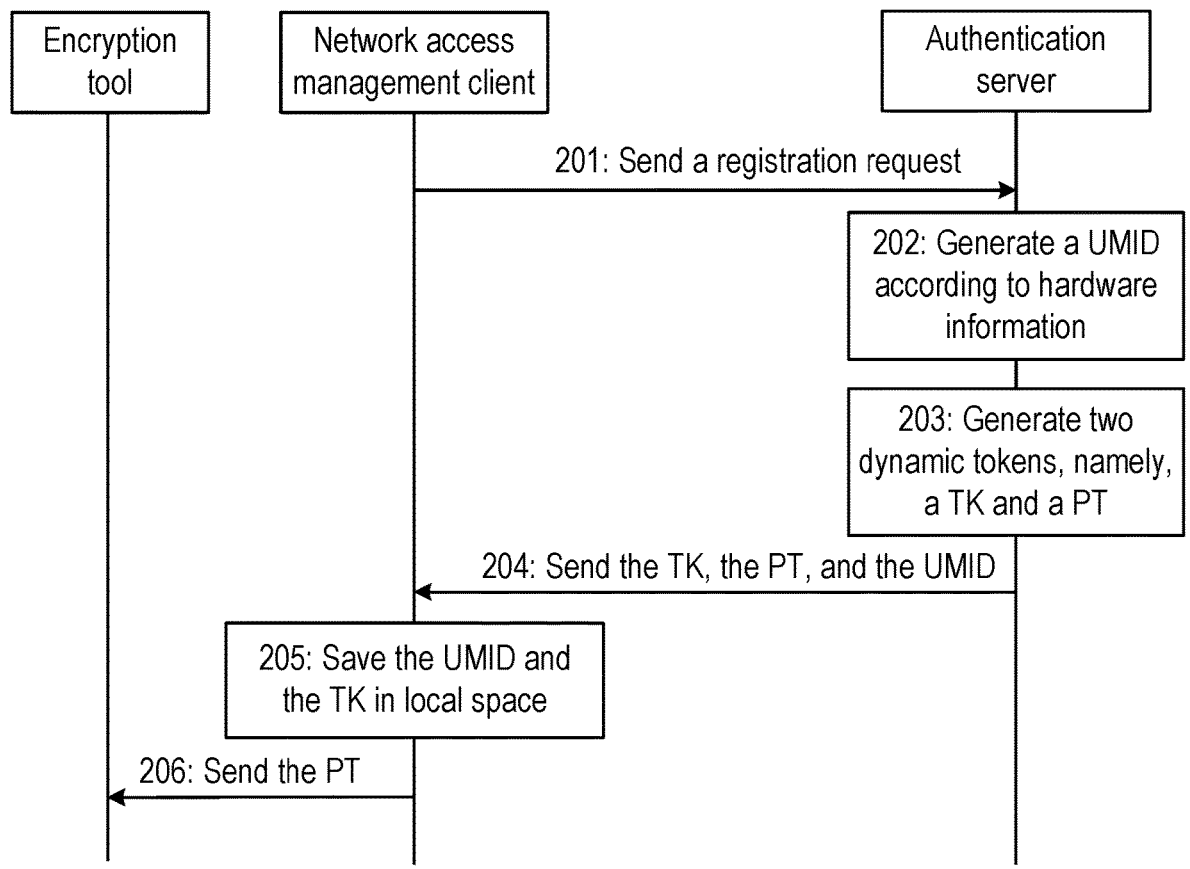
FIG. 2 is a schematic flowchart illustrating registration of a network access management client with an authentication server provided in another exemplary embodiment of the present application.
Figure 4:
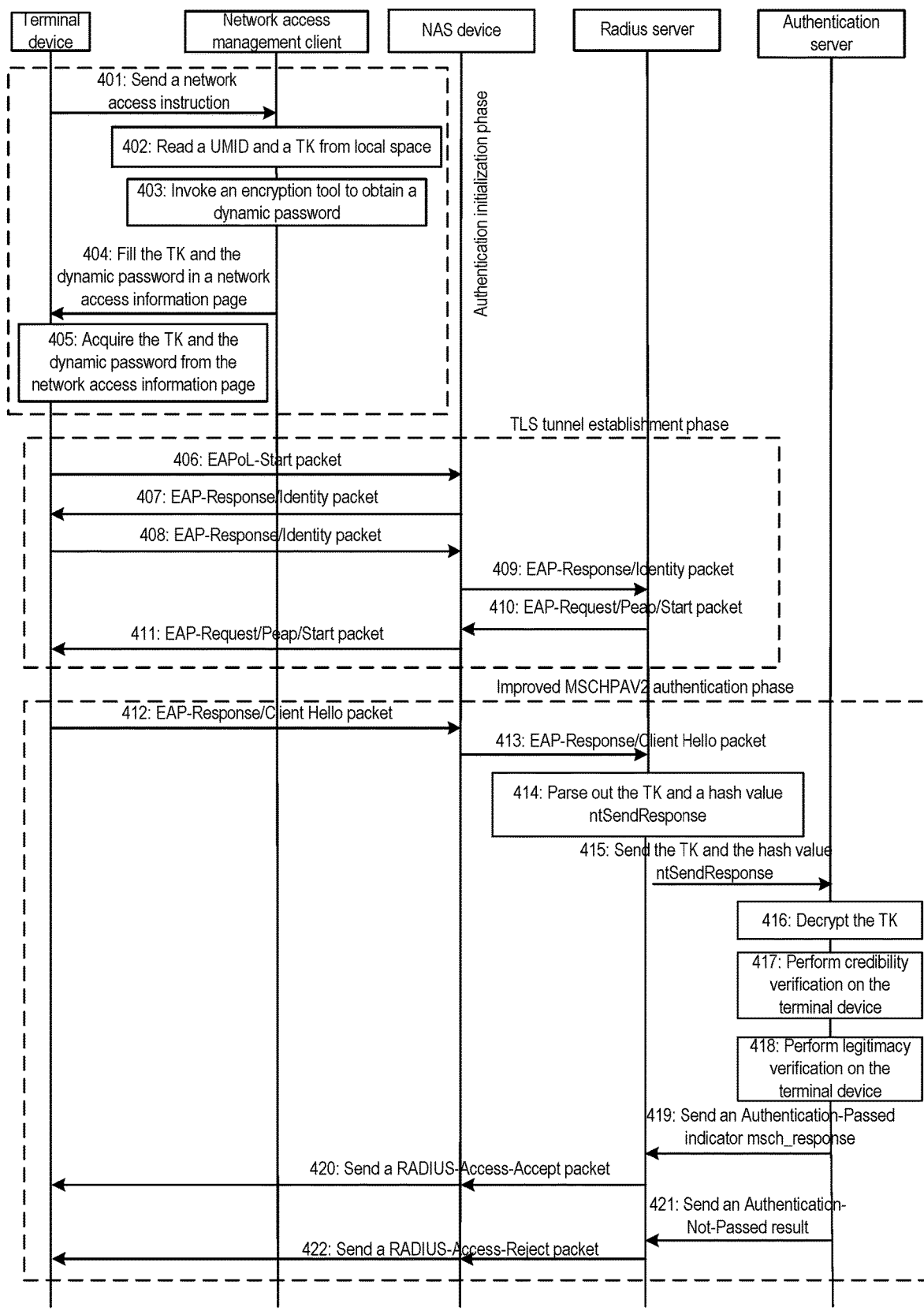
FIG. 4 is a schematic flowchart of an exemplary network access authentication method provided in still another exemplary embodiment of the present application.

In the network access authentication system shown in FIG. 3, the terminal device 10 may register with the authentication server 20 using the procedure shown in FIG. 2. Afterwards, when a user needs to access the network 21 to which the authentication server 20 belongs through the terminal device 10, the user may enter a network access authentication procedure. Optionally, as shown in FIG. 4, an authentication procedure that can be implemented in the network access authentication system shown in FIG. 3.

In one embodiment, the authentication procedure can include an authentication initialization phase. The authentication initialization phase may include steps 401 through 405.

In step 401, the terminal device 10 sends a network access instruction to the network access management client 30 in response to a network access operation triggered by a user, and at the same time, presents a network access information page on an interface of the terminal device.

In step 402 the network access management client 30 may read a UMID and a TK from local space and use the TK as a user name.

In step 403, the network access management client 30 invokes an encryption tool so that the encryption tool encrypts the UMID and a time value within a current time step using a seed key to obtain a dynamic password.

In one exemplary implementation, depending on application requirements, the time step may be 5 minutes, 3 minutes, 2 minutes, or the like.

In step 404, the network access management client 30 automatically fills the TK and the dynamic password in the network access information page.

In step 405 the terminal device 10 acquires the TK and the dynamic password from the network access information page.

In one embodiment, the authentication procedure can include a transport Layer Security (TLS) tunnel establishment phase. The transport Layer Security (TLS) tunnel establishment phase may include steps 406 through 411.

In step 406, the terminal device 10 sends an EAPoL-Start packet to the NAS device 50 to start 802.1X access.

In step 407, the NAS device 50 sends an EAP-Request/Identity packet to the terminal device 10, requesting the terminal device 10 to report a network identity of the user.

In step 408, the terminal device 10 responds to the NAS device 50 with an EAP-Response/Identity packet.

In step 409, the NAS device 50 sends, in an EAPoR (EAP over Radius) packet format, EAP-Response/Identity to the Radius server 40.

In step 410, the Radius server 40 receives the EAP-Response/Identity packet, determines to use EAP-PEAP authentication according to the configuration, and sends a RADIUS-Access-Challenge packet to the NAS device 50, where the packet includes an EAP-Request/Peap/Start packet sent by the Radius server 40 to the terminal device 10 indicating the intention to start EAP-PEAP authentication.

In step 411, the NAS device 50 sends the EAP-Request/Peap/Start packet to the terminal device 10.

In one embodiment, the authentication procedure can include an improved MSCHPAV2 authentication phase. The improved MSCHPAV2 authentication phase may include steps 412 through 422.

In step 412, after receiving the EAP-Request/Peap/Start packet, the terminal device 10 processes the dynamic password according to an MSCHPAV2 algorithm to obtain a hash value denoted as ntSendResponse, and encapsulates the user name and the hash value ntSendResponse in an EAP-Response/Client Hello packet and sends the packet to the NAS device 50.

In step 413, the NAS device 50 sends, in the EAPoR packet format, the EAP-Response/Client Hello packet to the Radius server 40.

In step 414, the Radius server 40 receives the EAP-Response/Client Hello packet sent from the terminal device 10 and then parses out the TK and the hash value ntSendResponse therefrom.

In step 415, the Radius server 40 sends the TK and the hash value ntSendResponse to the authentication server 20.

In step 416, the authentication server 20 decrypts the user name according to a set decryption algorithm. If the user name is successfully decrypted, the procedure proceeds to step 417. If the user name is not successfully decrypted, the procedure proceeds to step 421. The decryption algorithm corresponds to the encryption algorithm employed when the authentication server 20 generates a user name in the registration procedure.

In step 417, the authentication server 20 performs creditability verification on the terminal device 10 according to a device ID decrypted from the user name. If the terminal device 10 passes the creditability verification, the procedure proceeds to step 418. If the creditability verification is not passed, the procedure proceeds to step 421.

In step 418, the authentication server 20 performs legitimacy verification on the terminal device 10 according to the device ID and the hash value ntSendResponse. If the legitimacy verification is passed, the procedure proceeds to step 419. If the legitimacy verification is not passed, the procedure proceeds to step 421.

In one embodiment, the authentication server 20 records mapping data of authenticated devices. The mapping data of the authenticated devices includes information such as device IDs of the authenticated devices, MAC addresses, user names, hash values, and hash passwords required during authentication. Based on this, the authentication server 20 may determine, according to the device ID, whether a hash password used when the terminal device 10 passed authentication last time exists in the mapping data of the authenticated devices.

If the determination result is the password exists, then the hash password used when the terminal device 10 passed authentication last time is hashed to obtain a hash value; the hash value is compared with the hash value ntSendResponse. If the two hash values are the same, it is determined that the terminal device 10 passes the legitimacy verification. If the two hash values are not the same, it is determined that the terminal device 10 does not pass the legitimacy verification.

If the determination result is the password does not exist, a current time step and a historical time step adjacent to the current time step are determined according to a current time; the device ID and a time value within each determined time step are encrypted using the seed key agreed upon with the network access management client 30 to obtain at least two dynamic passwords. The at least two dynamic passwords are processed according to the MSCHPAV2 algorithm to obtain at least two hash passwords; and then the at least two hash passwords are hashed to obtain at least two hash values. The at least two hash values are compared with the hash value ntSendResponse. If a hash value is the same as the hash value ntSendResponse and is part of the at least two hash values, it is determined that the terminal device 10 passes the legitimacy verification. If no hash value is the same as the hash value ntSendResponse and is part the at least two hash values, it is determined that the terminal device 10 does not pass the legitimacy verification.

After it is determined that the terminal device 10 passes the legitimacy verification, a hash password corresponding to the hash value is the same as the hash value ntSendResponse is stored in the mapping data of the terminal device 10.

In step 419, the authentication server 20 generates an Authentication-Passed indicator msch_response through the MSCHPAV2 algorithm, and sends the Authentication-Passed indicator msch_response to the Radius server 40.

In step 420, the Radius server 40 encapsulates the Authentication-Passed indicator msch_response in a RADIUS-Access-Accept packet, and sends the RADIUS-Access-Accept packet to the terminal device 10 via the NAS device 50, to end the authentication procedure.

In step 421, the authentication server 20 sends an Authentication-Not-Passed result to the Radius server 40, and the procedure proceeds to step 422.

In step 422, the Radius server 40 encapsulates the Authentication-Not-Passed result in a RADIUS-Access-Reject packet, and via the NAS device 50, sends the RADIUS-Access-Reject packet to the terminal device 10 to end the authentication procedure.

Based on the aforementioned network access authentication system shown in FIG. 1 or FIG. 3, the following embodiments of the present application provide procedures of several network access authentication methods respectively from the perspectives of a network access management client, a terminal device, and an authentication server.

Figure 5:
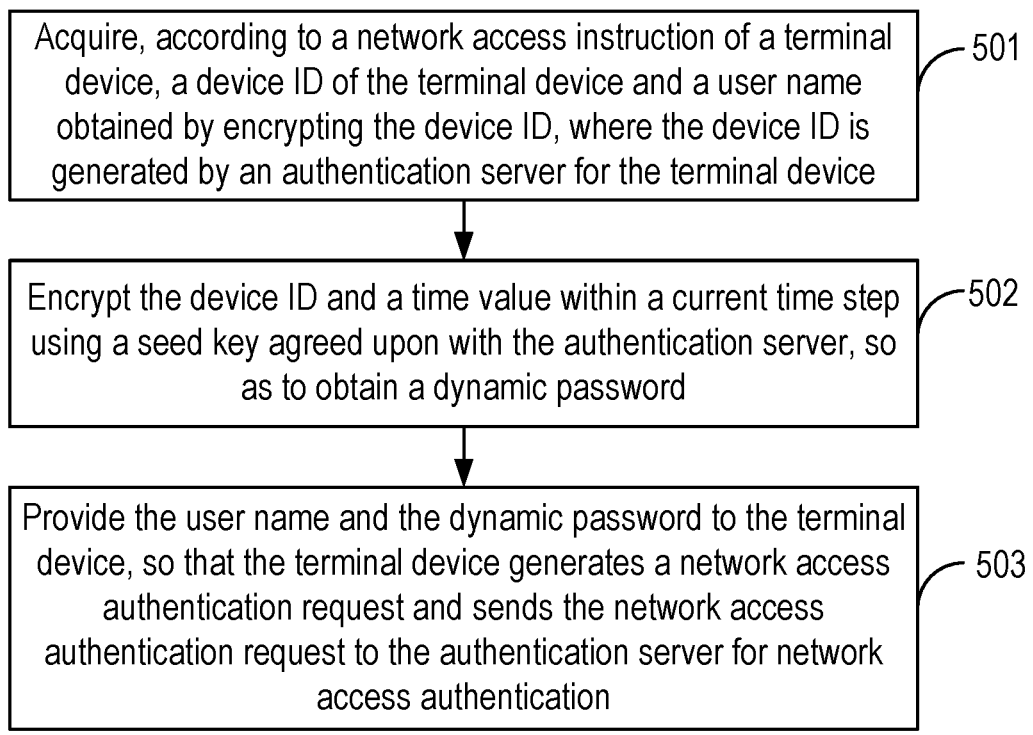
FIG. 5 is a schematic flowchart of a network access authentication method described from the perspective of a network access management client and provided in still another exemplary embodiment of the present application.

From the perspective of a network management client, one embodiment of the procedure of a network access authentication method is shown in FIG. 5.

In step 501, acquire, according to a network access instruction of a terminal device, a device ID of the terminal device and a user name obtained by encrypting the device ID, where the device ID is generated by an authentication server for the terminal device.

In step 502, encrypt the device ID and a time value within a current time step using a seed key agreed upon with the authentication server, so as to obtain a dynamic password.

In step 503, provide the user name and the dynamic password to the terminal device, so that the terminal device generates a network access authentication request and sends the network access authentication request to the authentication server for network access authentication.

In an alternative implementation, providing the user name and the dynamic password to the terminal device includes:
filling the user name and the dynamic password in a network access information page provided by the terminal device; or
outputting the user name and the dynamic password to a local-end page and presenting the local-end page to a user according to an access request of the user, so that the user copies the user name and the dynamic password from the local-end page to the network access information page provided by the terminal device.

In an alternative implementation, the seed key is maintained and managed by an encryption tool independent of the local end. Based on this, the encrypting the device ID and a time value within a current time step using a seed key agreed upon with the authentication server, so as to obtain a dynamic password includes: sending the device ID and the time value within the current time step to the encryption tool, so that the encryption tool encrypts the device ID and the time value within the current time step using the seed key and outputs the dynamic password.

In an alternative implementation, before the acquiring, according to a network access instruction of a terminal device, a device ID of the terminal device and a user name obtained by encrypting the device ID, registration with the authentication server may further be performed. In the registration procedure, the network access management client mainly executes the following operations: sending a registration request to the authentication server, where the registration request includes hardware information of the terminal device, and the hardware information is used by the authentication server to generate the device ID for the terminal device; receiving the user name and the device ID delivered by the authentication server and the seed key encrypted with the user name and the device ID; storing the device ID and the user name in local space, and sending the seed key encrypted with the user name and the device ID to the encryption tool, so that the encryption tool decrypts the seed key.

In an alternative implementation, the registration request further includes: user information corresponding to the terminal device, where the user information is used by the authentication server to generate a user ID for the terminal device. Based on this, the network access management client further receives the user ID delivered by the authentication server.

Figure 6:
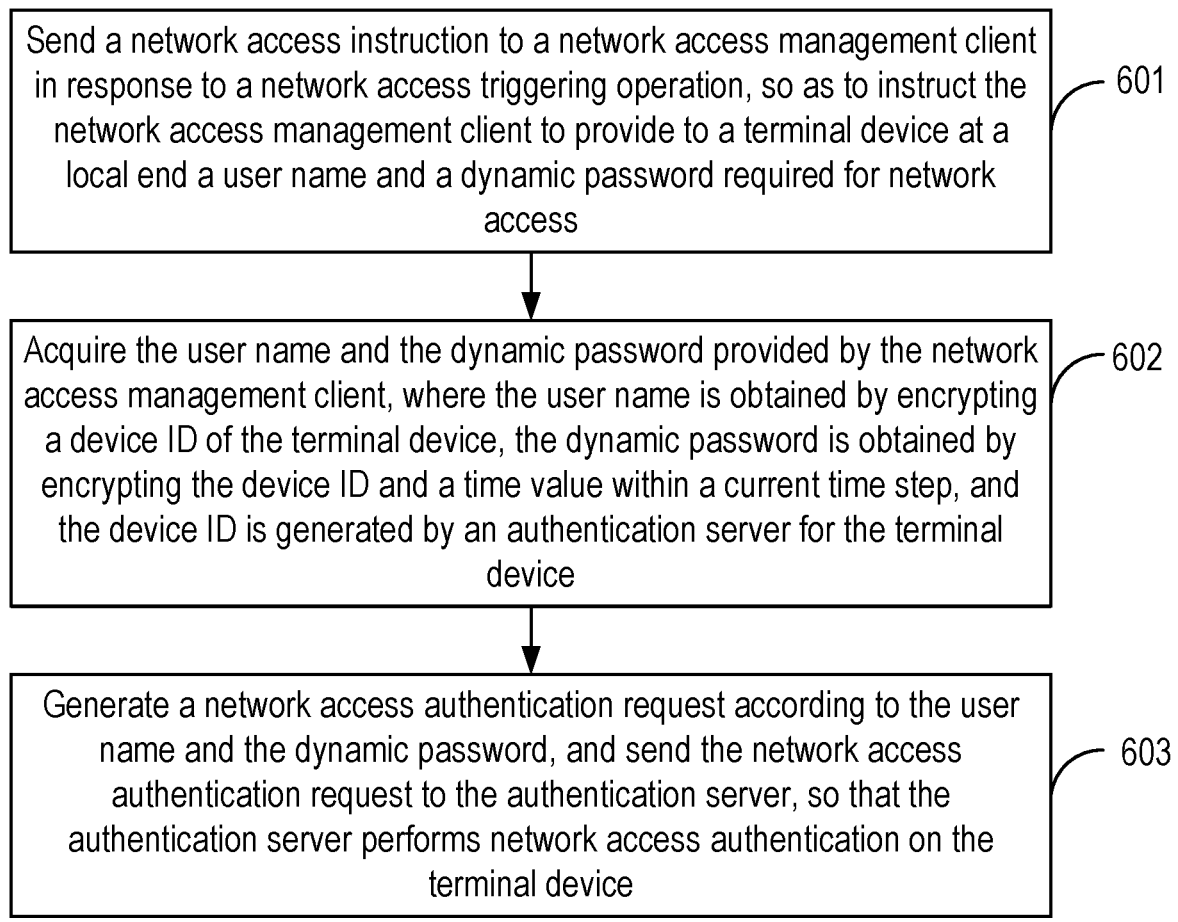
FIG. 6 is a schematic flowchart of a network access authentication method described from the perspective of a terminal device and provided in still another exemplary embodiment of the present application.

From the perspective of a terminal device, one embodiment of the procedure of a network access authentication method is shown in FIG. 6

In step 601, send a network access instruction to a network access management client in response to a network access triggering operation, so as to instruct the network access management client to provide to a terminal device at a local end a user name and a dynamic password required for network access.

In step 602, acquire the user name and the dynamic password provided by the network access management client, where the user name is obtained by encrypting a device ID of the terminal device, the dynamic password is obtained by encrypting the device ID and a time value within a current time step, and the device ID is generated by an authentication server for the terminal device.

In step 603, generate a network access authentication request according to the user name and the dynamic password, and send the network access authentication request to the authentication server, so that the authentication server performs network access authentication on the terminal device.

In an alternative implementation, when the network access triggering operation is responded to, a network access information page may further be presented to a user to acquire the user name and the dynamic password. Based on this, acquiring the user name and the dynamic password provided by the network access management client may include: acquiring the user name and the dynamic password from the network access information page. The user name and the dynamic password are filled in the network access information page by the network access management client, or copied from a page of the network access management client to the network access information page by the user.

Figure 7:
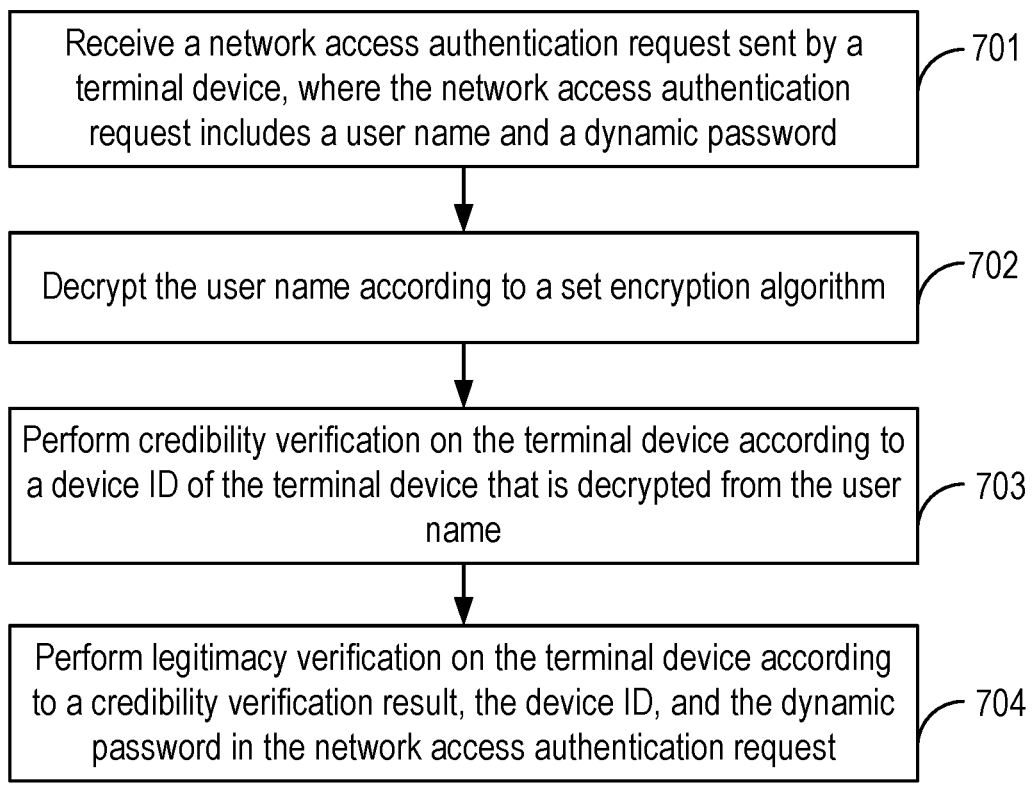
FIG. 7 is a schematic flowchart of a network access authentication method described from the perspective of an authentication server and provided in still another exemplary embodiment of the present application.

From the perspective of an authentication server, one embodiment of the procedure of a network access authentication method is shown in FIG. 7.

In step 701, receive a network access authentication request sent by a terminal device, where the network access authentication request includes a user name and a dynamic password.

In step 702: decrypt the user name according to a set encryption algorithm.

In step 703: Perform creditability verification on the terminal device according to a device ID of the terminal device that is decrypted from the user name.

In step 704, perform legitimacy verification on the terminal device according to a creditability verification result, the device ID, and the dynamic password in the network access authentication request.

In an alternative implementation, performing creditability verification on the terminal device according to a device ID of the terminal device that is decrypted from the user name includes: when the device ID of the terminal device is successfully decrypted from the user name, searching a registered device list according to the device ID, where the registered device list stores device IDs of registered devices; finding the device ID from the registered device list, and querying a device status list, where the device status list stores statuses of the registered devices; if it is found from the device status list that the terminal device is in a normal state, determining that the terminal device passes the creditability verification.

In an alternative implementation, the user name further includes a user ID corresponding to the terminal device. Based on this, before the performing creditability verification on the terminal device according to a device ID, legitimacy verification may further be performed. The legitimacy verification may be performed according to the user ID and user information corresponding to the pre-registered terminal device, on a user to which the terminal device belongs; and when the user to which the terminal device belongs passes the legitimacy verification, the operation of performing creditability verification on the terminal device according to the device ID is executed.

In an alternative implementation, performing legitimacy verification on the terminal device according to a creditability verification result, the device ID, and the dynamic password in the network access authentication request includes: when the terminal device passes the creditability verification, separately encrypting the device ID and a time value within each of at least two time steps using a seed key agreed upon with a network access management client, so as to generate at least two dynamic passwords; and performing legitimacy verification on the terminal device according to the at least two dynamic passwords and the dynamic password in the network access authentication request, where the at least two time steps include a current time step and at least one historical time step closest to the current time step.

In an alternative implementation, before separately encrypting the device ID and a time value within each of at least two time steps using a seed key agreed upon with a network access management client, so as to obtain at least two dynamic passwords, it may further be determined, according to the device ID, whether a dynamic password used when the terminal device passes authentication last time exists in mapping data of authenticated devices. If the result is the dynamic password exists, legitimacy verification is performed on the terminal device according to the dynamic password used when the terminal device passed authentication last time and the dynamic password in the network access authentication request. If the result is the dynamic password does not exist, executing the operation of separately encrypting the device ID and a time value within each of at least two time steps using a seed key agreed upon with a network access management client, so as to generate at least two dynamic passwords is performed.

In an alternative implementation, before receiving a network access authentication request sent by a terminal device, the method further includes a registration procedure. In the registration procedure, the authentication server executes the following operations: receiving a registration request sent by the network access management client, where the registration request carries hardware information of the terminal device; generating the device ID for the terminal device according to the hardware information in the registration request; encrypting the device ID so as to generate the user name; encrypting the seed key using the user name and the device ID to obtain an encrypted seed key; and sending the user name, the device ID, and the encrypted seed key to the network access management client.

It should be noted that the steps of the methods provided in the aforementioned embodiments may be performed by the same device, or the methods may be executed by different devices. In one exemplary implementation, step 501 to step 503 may be executed by device A. In another exemplary implementation, steps 501 and 502 may be executed by device A, and step 503 may be executed by device B; and so on.

Figure 8A:
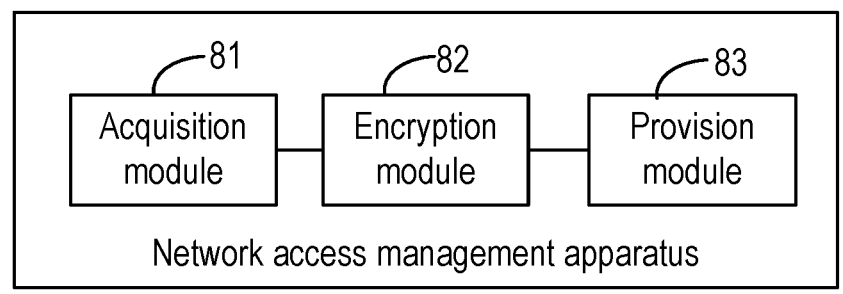
FIG. 8a is a schematic structural diagram of an exemplary network access management apparatus provided in still another exemplary embodiment of the present application.

FIG. 8*a* is a schematic structural diagram of a network access management apparatus provided in still another embodiment of the present application. The network access management apparatus may be implemented as the aforementioned network access management client. As shown in FIG. 8*a*, the network access management apparatus includes: an acquisition module 81, an encryption module 82, and a provision module 83.

The acquisition module 81 is configured to acquire, according to a network access instruction of a terminal device, a device ID of the terminal device and a user name obtained by encrypting the device ID, where the device ID is generated by an authentication server for the terminal device.

The encryption module 82 is configured to encrypt the device ID and a time value within a current time step using a seed key agreed upon with the authentication server, so as to obtain a dynamic password.

The provision module 83 is configured to provide the user name and the dynamic password to the terminal device, so that the terminal device generates a network access authentication request and sends the network access authentication request to the authentication server for network access authentication.

In an alternative implementation, the provision module 83 is configured to: fill the user name and the dynamic password in a network access information page provided by the terminal device; or output the user name and the dynamic password to a local-end page and present the local-end page to a user according to an access request of the user, so that the user copies the user name and the dynamic password from the local-end page to the network access information page provided by the terminal device.

In an alternative implementation, the seed key is maintained and managed by an encryption tool independent of the local end. Based on this, the encryption module 82 is specifically configured to: send the device ID and the time value within the current time step to the encryption tool, so that the encryption tool encrypts the device ID and the time value within the current time step using the seed key and outputs the dynamic password.

In an alternative implementation, the network access management apparatus further includes: a sending module or component, a receiving module or component, and a storage module or component.

The sending module is configured to send a registration request to the authentication server, where the registration request includes hardware information of the terminal device, and the hardware information is used by the authentication server to generate the device ID for the terminal device.

The receiving module is configured to receive the user name and the device ID delivered by the authentication server and a seed key encrypted with the user name and the device ID.

The storage module is configured to store the device ID and the user name in local space, and send the seed key encrypted with the user name and the device ID to the encryption tool, so that the encryption tool decrypts the seed key.

In an alternative implementation, the registration request further includes: user information corresponding to the terminal device, where the user information is used by the authentication server to generate a user ID for the terminal device.

Figure 8B:
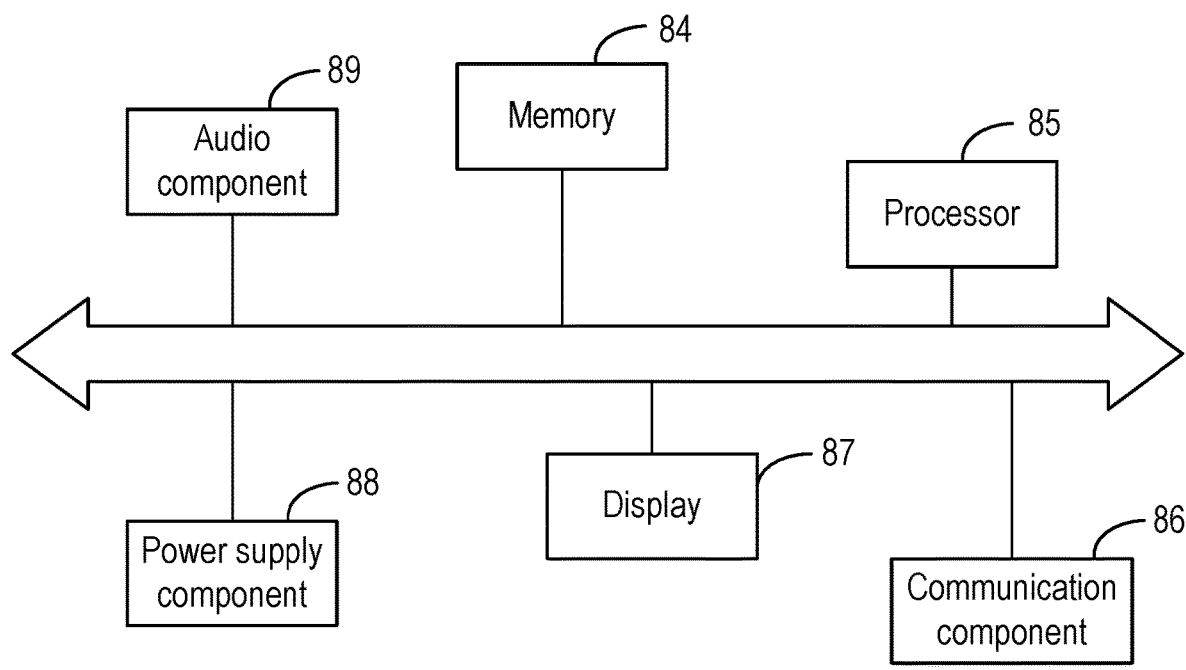
FIG. 8b is a schematic structural diagram of an exemplary electronic device provided in still another exemplary embodiment of the present application.

The internal function and structure of the network access management apparatus are described above. As shown in FIG. 8*b*, in practice, the network access management apparatus may be implemented as an electronic device including: a memory 84 and a processor 85.

The memory 84 may be configured to store various other data to support operations on the electronic device.

Examples of the data include instructions for any application or method operating on the electronic device, contact data, phonebook data, messages, pictures, videos, and etc.

The memory 84 may be implemented using any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 85 is coupled to the memory 84 and configured to execute a program in the memory 84, so as to: acquire, according to a network access instruction of a terminal device, a device ID of the terminal device and a user name obtained by encrypting the device ID, where the device ID is generated by an authentication server for the terminal device; encrypt the device ID and a time value within a current time step using a seed key agreed upon with the authentication server, so as to obtain a dynamic password; and provide the user name and the dynamic password to the terminal device, so that the terminal device generates a network access authentication request and sends the network access authentication request to the authentication server for network access authentication.

When executing the program in the memory 84, the processor 85 may further implement other functions in addition to the aforementioned function; reference may be made to the description related to the network access management client in the foregoing embodiments for details.

Further, as shown in FIG. 8*b*, the electronic device further includes: a communication component 86, a display 87, a power supply component 88, an audio component 89, and other components. FIG. 8*b* only schematically shows some components, which does not mean that the electronic device includes only the components shown in FIG. 8*b*.

Accordingly, in one embodiment a computer-readable storage medium stores a computer program that, when executed by a computer, can implement the method steps or functions related to the network access management client in the aforementioned embodiments.

Figure 9A:
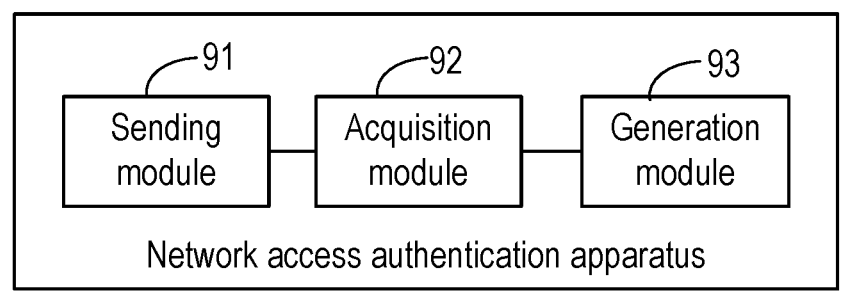
FIG. 9a is a schematic structural diagram of an exemplary network access authentication apparatus provided in still another exemplary embodiment of the present application.

FIG. 9*a* is a schematic structural diagram of a network access authentication apparatus provided in still another embodiment of the present application. The network access authentication apparatus may be located in a terminal device requiring network access authentication. As shown in FIG. 9*a*, the network access authentication apparatus includes: a sending module 91, an acquisition module 92, and a generation module 93.

The sending module 91 is configured to send a network access instruction to a network access management client in response to a network access triggering operation, so as to instruct the network access management client to provide to a terminal device at a local end a user name and a dynamic password required for network access.

The acquisition module 92 is configured to acquire the user name and the dynamic password provided by the network access management client, where the user name is obtained by encrypting a device ID of the terminal device; the dynamic password is obtained by encrypting the device ID and a time value within a current time step; and the device ID is generated by an authentication server for the terminal device.

The generation module 93 is configured to generate a network access authentication request according to the user name and the dynamic password.

The sending module 91 is further configured to send the network access authentication request to the authentication server, so that the authentication server performs network access authentication on the terminal device.

In an alternative implementation, the network access authentication apparatus further includes: a display module configured to, when responding to the network access triggering operation, present a network access information page to acquire the user name and the dynamic password required for network access authentication. Based on this, the acquisition module 92 is specifically configured to acquire the user name and the dynamic password from the network access information page, where the user name and the dynamic password are filled in the network access information page by the network access management client, or copied from a page of the network access management client to the network access information page by the user.

Figure 9B:
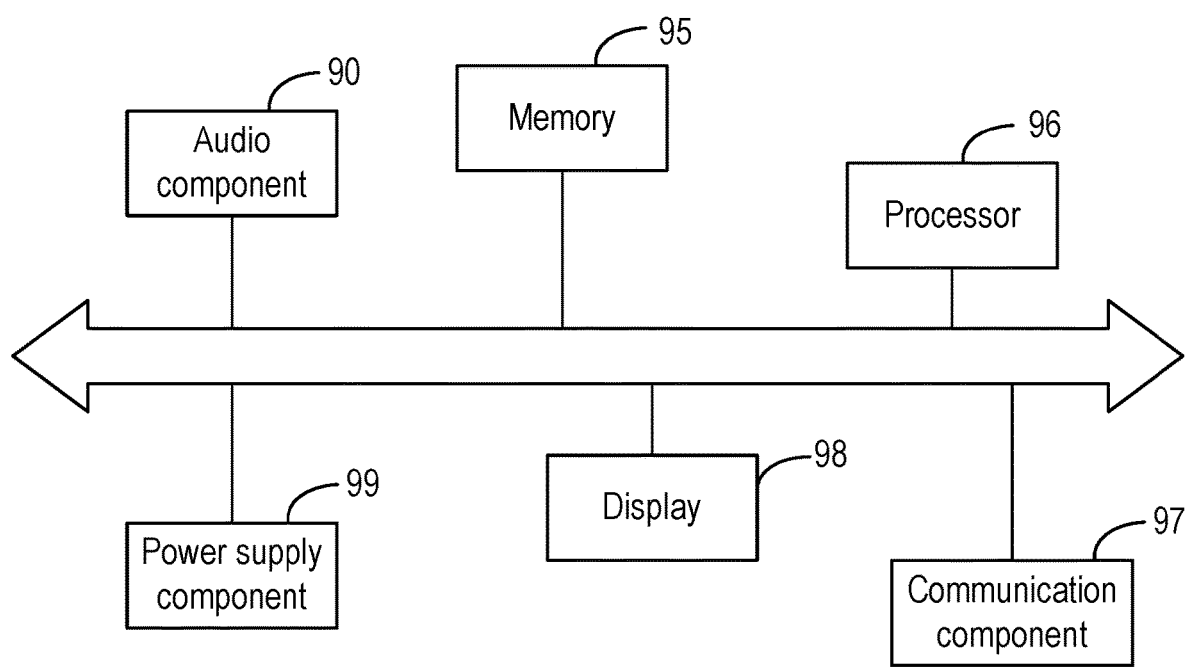
FIG. 9*b* is a schematic structural diagram of an exemplary terminal device provided in still another exemplary embodiment of the present application.

The internal function and structure of the network access authentication apparatus are described above. As shown in FIG. 9*b*, in practice, the network access authentication apparatus may be implemented as a terminal device including: a memory 95, a processor 96, and a communication component 97.

The memory 95 may be configured to store various other data to support operations on the terminal device. Examples of the data include instructions for any application or method operating on the terminal device, contact data, phonebook data, messages, pictures, videos, etc.

The memory 95 may be implemented using any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 96 is coupled to the memory 95 and configured to execute a program in the memory 95, so as to:
control the communication component 97 to send a network access instruction to a network access management client in response to a network access triggering operation, so as to instruct the network access management client to provide to the terminal device a user name and a dynamic password required for network access;
acquire the user name and the dynamic password provided by the network access management client, where the user name is obtained by encrypting a device ID of the terminal device, the dynamic password is obtained by encrypting the device ID and a time value within a current time step, and the device ID is generated by an authentication server for the terminal device; and
generate a network access authentication request according to the user name and the dynamic password, and control the communication component 97 to send the network access authentication request to the authentication server, so that the authentication server performs network access authentication on the terminal device.

The communication component is configured to send the network access instruction to the network access management client and send the network access authentication request to the authentication server.

When executing the program in the memory 95, the processor 96 may further implement other functions in addition to the aforementioned function; reference may be made to the description related to the terminal device in the foregoing embodiments for details.

Further, as shown in FIG. 9b, the terminal device further includes: a display 98, a power supply component 99, an audio component 90, and other components. FIG. 9b only schematically shows some components, which does not imply that the terminal device includes only the components shown in FIG. 9b.

In one embodiment a computer-readable storage medium storing a computer program that, when executed by a computer, can implement the method steps or functions related to the terminal device in the aforementioned embodiments.

Figure 10A:
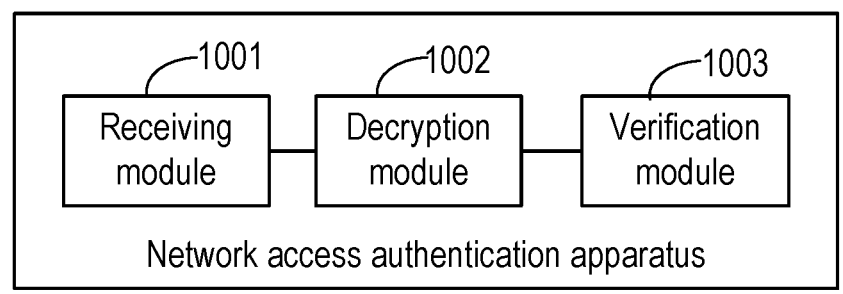
FIG. 10*a* is a schematic structural diagram of an exemplary network access authentication apparatus provided in still another exemplary embodiment of the present application.

FIG. 10a is a schematic structural diagram of a network access authentication apparatus provided in still another embodiment of the present application. The network access authentication apparatus may be located in an authentication server. As shown in FIG. 10a, the network access authentication apparatus includes: a receiving module 1001, a decryption module 1002, and a verification module 1003.

The receiving module 1001 is configured to receive a network access authentication request sent by a terminal device, where the network access authentication request includes a user name and a dynamic password.

The decryption module 1002 is configured to decrypt the user name according to a set decryption algorithm.

The verification module 1003 is configured to perform creditability verification on the terminal device according to a device ID of the terminal device that is decrypted from the user name.

The verification module 1003 is further configured to perform legitimacy verification on the terminal device according to a creditability verification result, the device ID, and the dynamic password in the network access authentication request.

In an alternative implementation, when performing creditability verification on the terminal device, the verification module 1003 is specifically configured to: when the device ID of the terminal device is successfully decrypted from the user name, search a registered device list according to the device ID, where the registered device list stores device IDs of registered devices; if the device ID is found from the registered device list, query a device status list, where the device status list stores statuses of the registered devices; and if it is found from the device status list that the terminal device is in a normal state, determine that the terminal device passes the creditability verification.

In an alternative implementation, the verification module 1003 is further configured to: perform, according to the user ID and user information corresponding to the pre-registered terminal device, identity authentication on a user to which the terminal device belongs; and when the user to which the terminal device belongs passes the identity authentication, execute the operation of performing creditability verification on the terminal device according to the device ID.

In an alternative implementation, when performing legitimacy verification on the terminal device, the verification module 1003 is specifically configured to: when the terminal device passes the creditability verification, separately encrypt the device ID and a time value within each of at least two time steps using a seed key agreed upon with a network access management client, so as to generate at least two dynamic passwords; and perform legitimacy verification on the terminal device according to the at least two dynamic passwords and the dynamic password in the network access authentication request, where the at least two time steps include a current time step and at least one historical time step closest to the current time step.

In an alternative implementation, the verification module 1003 is further configured to: judge, according to the device ID, whether a dynamic password used when the terminal device passes authentication last time exists in mapping data of authenticated devices; if the judgment result is Yes, perform legitimacy verification on the terminal device according to the dynamic password used when the terminal device passes authentication last time and the dynamic password in the network access authentication request; and if the judgment result is No, execute the operation of separately encrypting the device ID and a time value within each of at least two time steps using a seed key agreed upon with a network access management client, so as to generate at least two dynamic passwords.

In an alternative implementation, the network access authentication apparatus further includes: a generation module, an encryption module, and a sending module.

The receiving module 1001 is further configured to receive a registration request sent by the network access management client, where the registration request carries hardware information of the terminal device.

The generation module is configured to generate the device ID for the terminal device according to the hardware information.

The encryption module is configured to encrypt the device ID to generate the user name, and encrypt the seed key using the user name and the device ID to obtain an encrypted seed key.

The sending module is configured to send the user name, the device ID, and the encrypted seed key to the network access management client.

Figure 10B:
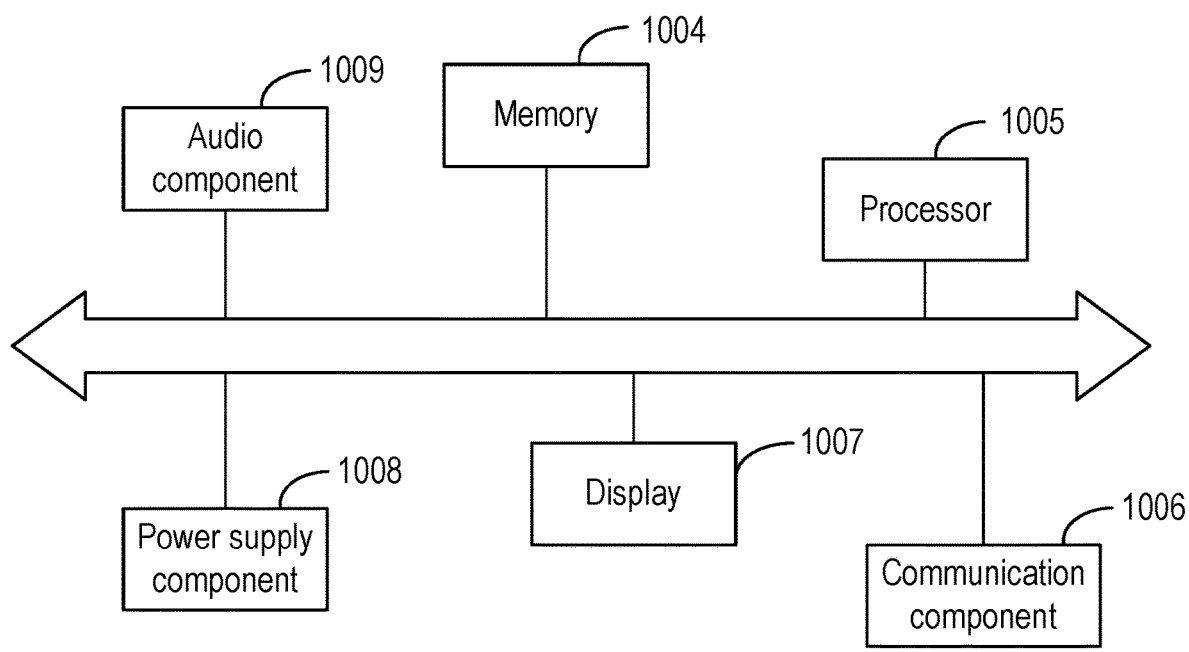
FIG. 10*b* is a schematic structural diagram of an exemplary authentication server provided in still another exemplary embodiment of the present application.

The internal function and structure of the network access authentication apparatus are described above. As shown in FIG. 10b, in practice, the network access authentication apparatus may be implemented as an authentication server including: a memory 1004, a processor 1005, and a communication component 1006.

The memory 1004 may be configured to store various other data to support operations on the authentication server. Examples of such data include instructions for any application or method operated on the authentication server, contact data, phonebook data, messages, pictures, videos, etc.

The memory 1004 may be implemented using any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The communication component 1006 is configured to receive a network access authentication request sent by a terminal device, where the network access authentication request includes a user name and a dynamic password.

The processor 1005 is coupled to the memory 1004 and configured to execute a program in the memory 1004, so as to:

decrypt the user name according to a set decryption algorithm;

perform creditability verification on the terminal device according to a device ID of the terminal device that is decrypted from the user name; and perform legitimacy verification on the terminal device according to a creditability verification result, the device ID, and the dynamic password in the network access authentication request.

When executing the program in the memory 1004, the processor 1005 may further implement other functions in addition to the aforementioned function; reference may be made to the description related to the authentication server in the foregoing embodiments for details.

Further, as shown in FIG. 10b, the authentication server further includes: a display 1007, a power supply component 1008, an audio component 1009, and other components. FIG. 10b only schematically shows some components, which does not mean that the authentication server includes only the components shown in FIG. 10b.

Accordingly, in one embodiment, a computer-readable storage medium stores a computer program that, when executed by a computer, can implement the method steps or functions related to the authentication server in the aforementioned embodiments.

The communication component in FIG. 8b, FIG. 9b, and FIG. 10b may be configured to facilitate wired or wireless communication between a device to which the communication component belongs and other devices. The device to which the communication component belongs can access a wireless network based on a communication standard, such as WiFi, 2G, or 3G, or a combination thereof. In one exemplary embodiment, the communication component receives a broadcast signal or broadcast-related information from an external broadcast management system via a broadcast channel. In one exemplary embodiment, the communication component further includes a near field communication (NFC) module to facilitate short-range communications. For example, the NFC module may be implemented based on radio frequency identification (RFID) technology, Infrared Data Association (IrDA) technology, ultra-wideband (UWB) technology, Bluetooth (BT) technology, and other technologies.

The display in FIG. 8b, FIG. 9b, and FIG. 10b may include a screen. The screen may include a liquid crystal display (LCD) and a touch panel (TP). If the screen includes the touch panel, the screen may be implemented as a touch screen to receive input signals from a user. The touch panel can include one or a plurality of touch sensors to sense touches, swipes, and gestures on the touch panel. The touch sensors may not only sense a boundary of a touch or swipe action, but also detect a period of time and a pressure related to the touch or swipe operation.

The power supply component in FIG. 8b, FIG. 9b, and FIG. 10b supplies power to various components of the device to which the power supply component belongs. The power supply component may include a power management system, one or a plurality of power sources, and other components associated with the generation, management, and distribution of power for the device to which the power supply component belongs.

The audio component in FIG. 8b, FIG. 9b, and FIG. 10b is configured to output and/or input audio signals. For example, the audio component includes a microphone (MIC) configured to receive an external audio signal when a device to which the audio component belongs is in an operation mode, such as a call mode, a recording mode, and a voice recognition mode. The received audio signal may further be stored in the memory or sent via the communication component. In some embodiments, the audio component further includes a speaker to output audio signals.

Those skilled in the art should understand that the embodiments of the present application may include a method, a system, or a computer program product. Therefore, the present invention may use the form of a full hardware embodiment, a full software embodiment, or an embodiment combining software and hardware. Moreover, the present invention may use the form of a computer program product implemented on one or a plurality of computer-usable storage media (including, but not limited to, a magnetic disk memory, a CD-ROM, an optical memory, etc.) containing computer-usable program code therein.

The present invention is described with reference to flowcharts and/or block diagrams of a method, a device (system), and a computer program product according to the embodiments of the present invention. It should be understood that each procedure and/or block in the flowcharts and/or block diagrams, and a combination of procedures and/or blocks in the flowcharts and/or block diagrams may be implemented with computer program instructions. These computer program instructions may be provided to a processor of a general-purpose computer, a special-purpose computer, an embedded processor, or any other programmable data processing device to produce a machine, so that instructions executed by the processor of the computer or other programmable data processing device generate means for implementing a specified function in one or a plurality of procedures in the flowcharts and/or one or a plurality of blocks in the block diagrams.

These computer program instructions may also be stored in a computer-readable memory that can direct a computer or any other programmable data processing device to operate in a particular manner, such that the instructions stored in the computer-readable memory produce an article of manufacture including instruction means, the instruction means implementing a specified function in one or a plurality of procedures in the flowcharts and/or one or a plurality of blocks in the block diagrams.

These computer program instructions may also be loaded onto a computer or any other programmable data processing device so that a series of operational steps are performed on the computer or other programmable device to produce computer-implemented processing, and thus the instructions executed on the computer or other programmable device provide the steps for implementing a specified function in one or a plurality of procedures in the flowcharts and/or one or a plurality of blocks in the block diagrams.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The above descriptions are merely the embodiments of the present application, and are not intended to limit the present application. For those skilled in the art, the present application may have various alterations and changes. Any modifications, equivalent substitutions, improvements and the like made within the spirit and principle of the present application shall fall within the scope of the claims of the present application.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A network access authentication method, comprising:
    acquiring, according to a network access instruction of a terminal device, a device ID of the terminal device and a user name, wherein the user name is obtained by encrypting the device ID, and wherein the device ID is generated by an authentication server for the terminal device;
    encrypting the device ID and a time value within a current time step using a seed key agreed upon with the authentication server, so as to obtain a dynamic password, wherein the seed key is maintained and managed by an independent encryption tool, and the encrypting the device ID and a time value within a current time step using a seed key comprises:
    sending the device ID and the time value within the current time step to the independent encryption tool, so that the independent encryption tool encrypts the device ID and the time value within the current time step using the seed key and outputs the dynamic password; and
    providing the user name and the dynamic password to the terminal device, so that the terminal device generates a network access authentication request and sends the network access authentication request to the authentication server for network access authentication.

2. The method according to claim 1, wherein the providing the user name and the dynamic password to the terminal device comprises filling the user name and the dynamic password in a network access information page provided by the terminal device.

3. The method according to claim 1, wherein before the acquiring, a device ID of the terminal device and a user name, the method further comprises:
    sending a registration request to the authentication server, wherein the registration request comprises hardware information of the terminal device, and the hardware information is used by the authentication server to generate the device ID for the terminal device;
    receiving the device ID delivered by the authentication server and a seed key encrypted with the user name and the device ID; and
    storing the device ID and the user name in local space, and sending the seed key encrypted with the user name and the device ID to the independent encryption tool, so that the encryption tool decrypts the seed key.

4. The method according to claim 3, wherein the registration request further comprises: user information corresponding to the terminal device, wherein the user information is used by the authentication server to generate a user ID for the terminal device.

5. The method according to claim 1 further comprising:
    receiving the network access authentication request sent by the terminal device, wherein the network access authentication request generated according to the user name and the dynamic password; and
    performing network access authentication to the terminal device.

6. The method according to claim 1, wherein the providing the user name and the dynamic password to the terminal device comprises:
    putting the user name and the dynamic password in a local-end page; presenting the local-end page to the user according to an access request of the user; and
    retrieving the user name and dynamic password from a network access information page in response to a user copying the user name and the dynamic password from the local-end page to the network access information page provided by the terminal device.

7. A network access authentication method, comprising:
    receiving a network access authentication request sent by a terminal device, wherein the network access authentication request comprises a user name and a dynamic password, wherein the user name includes an encryption of a device ID;
    decrypting the user name according to a set decryption algorithm;
    performing creditability verification on the terminal device according to the device ID of the terminal device that is decrypted from the user name, wherein the performing creditability verification on the terminal device comprises:
    searching, in response to the device ID being successfully decrypted from the user name, a registered device list according to the device ID, wherein the registered device list stores device IDs of registered devices;

querying a device status list in response to the device ID being found in the registered device list, wherein the device status list stores statuses of the registered devices; and determining, in response to the device status list indicating the terminal device is in a normal state, that the terminal device passes the creditability verification; and performing legitimacy verification on the terminal device according to a creditability verification result, the device ID, and the dynamic password in the network access authentication request.

8. The method according to claim 7, wherein the user name further includes a user ID corresponding to the terminal device, and before the performing creditability verification on the terminal device according to the device ID that is decrypted from the user name, the method further comprises:

performing, according to the user ID and user information corresponding to the terminal device, identity authentication on a user to which the terminal device belongs, wherein the terminal device is pre-registered; and executing, in response to the user passing the identity authentication, the operation of performing creditability verification on the terminal device according to the device ID.

9. The method according to claim 7, wherein the performing legitimacy verification on the terminal device according to the creditability verification result, the device ID, and the dynamic password in the network access authentication request comprises:

when the terminal device passes the creditability verification, separately encrypting the device ID and a time value within each of at least two time steps using a seed key, wherein the seed key is agreed upon with a network access management client, so as to generate at least two dynamic passwords; and the performing legitimacy verification on the terminal device according to the at least two dynamic passwords and the dynamic password in the network access authentication request, wherein the at least two time steps comprise a current time step and at least one historical time step closest to the current time step.

10. The method according to claim 9, wherein before the separately encrypting the device ID and a time value within each of the at least two time steps, so as to obtain the at least two dynamic passwords, the method further comprises:

judging, according to the device ID, whether a prior dynamic password used when the terminal device passes authentication last time exists in mapping data of authenticated devices;

if the judging result is Yes, the prior dynamic password used when the terminal device passes authentication last time and the dynamic password in the network access authentication request are used as the at least two dynamic passwords and performing legitimacy verification on the terminal device according to the prior dynamic password used when the terminal device passes authentication last time and the dynamic password in the network access authentication request; and if the judging result is No, executing the operation of separately encrypting the device ID and a time value within each of at least two time steps using the seed key agreed upon with the network access management client, so as to generate the at least two dynamic passwords.

11. The method according to claim 7, wherein before the receiving a network access authentication request sent by a terminal device, the method further comprises:

receiving a registration request sent by a network access management client, wherein the registration request carries hardware information of the terminal device;

generating the device ID for the terminal device according to the hardware information;

encrypting the device ID to generate the user name;

encrypting a seed key using the user name and the device ID to obtain an encrypted seed key; and sending the user name, the device ID, and the encrypted seed key to the network access management client.

12. An electronic device, comprising:

a memory and a processor, wherein the memory is configured to store a program; and the processor is coupled to the memory and configured to execute the program in the memory, so as to:

acquire, according to a network access instruction of a terminal device, a device ID of the terminal device and a user name obtained by encrypting the device ID, wherein the device ID is generated by an authentication server for the terminal device;

encrypt the device ID and a time value within a current time step using a seed key agreed upon with the authentication server, so as to obtain a dynamic password, wherein the seed key is maintained and managed by an independent encryption tool, and the encrypting the device ID and a time value within a current time step using a seed key includes:

sending the device ID and the time value within the current time step to the independent encryption tool, so that the independent encryption tool encrypts the device ID and the time value within the current time step using the seed key and outputs the dynamic password; and provide the user name and the dynamic password to the terminal device, so that the terminal device generates a network access authentication request and sends the network access authentication request to the authentication server for network access authentication.

13. An authentication server, comprising:

a memory configured to store a program;

a communication component, including a transceiver, configured to receive a network access authentication request sent by a terminal device, wherein the network access authentication request comprises a user name and a dynamic password; and a processor coupled to the memory, wherein the processor is configured to execute the program in the memory, so as to:

decrypt the user name according to a set decryption algorithm;

perform creditability verification on the terminal device according to a device ID of the terminal device that is decrypted from the user name, wherein the user name further includes a user ID corresponding to the terminal device, and before the performing creditability verification on the terminal device according to the device ID that is decrypted from the user name, the method further comprises:

performing, according to the user ID and user information corresponding to the terminal device, identity authentication on a user to which the terminal device belongs, wherein the terminal device is pre-registered; and executing, in response to the user passing the identity authentication, the operation of performing creditability verification on the terminal device according to the device ID; and perform legitimacy verification on the terminal device according to a creditability verification result, the device ID, and the dynamic password in the network access authentication request.

14. An authentication system, comprising:

a terminal device configured to send a network access instruction to a network access management client in response to a network access triggering operation; acquire a user name and a dynamic password provided by the network access management client; and generate a network access authentication request according to the user name and the dynamic password, and send the network access authentication request to an authentication server;

the network access management client configured to acquire a device ID and the user name according to the network access instruction; encrypt the device ID and a time value within a current time step using a seed key agreed upon with the authentication server, so as to obtain the dynamic password; and provide the user name and the dynamic password to the terminal device, wherein the user name is obtained by encrypting the device ID, wherein the seed key is maintained and managed by an independent encryption tool, and the encrypting the device ID and a time value within a current time step using a seed key includes:

sending the device ID and the time value within the current time step to the independent encryption tool, so that the independent encryption tool encrypts the device ID and the time value within the current time step using the seed key and outputs the dynamic password; and the authentication server configured to receive the network access authentication request, wherein the network access authentication request comprises the user name and the dynamic password; perform creditability verification on the terminal device according to the device ID decrypted from the user name; and perform legitimacy verification on the terminal device according to a creditability verification result, the device ID, and the dynamic password.

15. The authentication system according to claim 14, wherein the network access management client is installed on the terminal device.

16. The authentication system according to claim 14, wherein the system further comprises: a network attached storage (NAS) device and a Radius server, wherein the terminal device is connected to the Radius server via the NAS device, and the Radius server is connected to the authentication server.

* * * * *